(12) United States Patent
Yamamoto

(10) Patent No.: US 9,419,297 B2
(45) Date of Patent: Aug. 16, 2016

(54) FUEL CELL MODULE

(71) Applicant: HONDA MOTOR CO., LTD., Tokyo (JP)

(72) Inventor: Jun Yamamoto, Wako (JE)

(73) Assignee: HONDA MOTOR CO., LTD., Tokyo (JP)

( * ) Notice: Subject to any disclaimer, the term of this patent is extended or adjusted under 35 U.S.C. 154(b) by 141 days.

(21) Appl. No.: 14/388,101

(22) PCT Filed: Mar. 18, 2013

(86) PCT No.: PCT/JP2013/058471
§ 371 (c)(1),
(2) Date: Sep. 25, 2014

(87) PCT Pub. No.: WO2013/161470
PCT Pub. Date: Oct. 31, 2013

(65) Prior Publication Data
US 2015/0044589 A1    Feb. 12, 2015

(30) Foreign Application Priority Data

Apr. 24, 2012  (JP) .................................. 2012-099206

(51) Int. Cl.
*H01M 8/06*    (2016.01)
*H01M 8/12*    (2016.01)
(Continued)

(52) U.S. Cl.
CPC ............. *H01M 8/0618* (2013.01); *C01B 3/384* (2013.01); *F28D 7/1669* (2013.01); *H01M 8/04022* (2013.01); *H01M 8/04074* (2013.01); *H01M 8/04268* (2013.01); *H01M 8/0662* (2013.01); *H01M 8/12* (2013.01);
(Continued)

(58) Field of Classification Search
CPC ................ H01M 8/0618; H01M 8/12; H01M 2008/1293; H01M 2250/20
See application file for complete search history.

(56) References Cited

U.S. PATENT DOCUMENTS 8,617,267 B2    12/2013 Son
9,240,601 B2 *  1/2016 Yoshimine .......... H01M 8/0625
(Continued)

FOREIGN PATENT DOCUMENTS

JP    2001-236980    8/2001
JP    2004-288434    10/2004
(Continued)

OTHER PUBLICATIONS

International Search Report, Date of Mailing: Jun. 24, 2013.
(Continued)

*Primary Examiner* — Stewart Fraser
(74) *Attorney, Agent, or Firm* — Rankin, Hill & Clark LLP

(57) ABSTRACT

A fuel cell module includes a first area where an exhaust gas combustor and a start-up combustor are provided, an annular second area around the first area where a heat exchanger is provided, an annular third area around the second area where a reformer is provided, an annular fourth area around the third area where an evaporator is provided, and a first partition member provided between the first area and the second area. The first partition member has a combustion gas hole for allowing the combustion gas to flow from the first area to the second area. A baffle circular member is provided inside the first partition member, between the exhaust gas combustor and the start-up combustor.

6 Claims, 17 Drawing Sheets

(51) Int. Cl.
*H01M 8/04* (2016.01)
*F28D 7/16* (2006.01)
*C01B 3/38* (2006.01)
*F28D 21/00* (2006.01)

(52) U.S. Cl.
CPC .. *C01B 2203/0233* (2013.01); *C01B 2203/066* (2013.01); *C01B 2203/0811* (2013.01); *C01B 2203/1247* (2013.01); *C01B 2203/1258* (2013.01); *C01B 2203/1288* (2013.01); *C01B 2203/1604* (2013.01); *F28D 2021/0043* (2013.01); *H01M 2008/1293* (2013.01); *H01M 2250/20* (2013.01); *Y02E 60/50* (2013.01); *Y02E 60/525* (2013.01); *Y02T 90/32* (2013.01)

(56) References Cited

U.S. PATENT DOCUMENTS

| | | | |
|---|---|---|---|
| 9,246,181 B2 * | 1/2016 | Yoshimine | H01M 8/0625 |
| 2001/0009732 A1 | 7/2001 | Schuler | |
| 2010/0021784 A1 | 1/2010 | Fourmigue | |
| 2011/0165477 A1 * | 7/2011 | Yamamoto | B01D 53/0423 429/410 |
| 2011/0165483 A1 * | 7/2011 | Yamamoto | B01J 8/0085 429/425 |
| 2015/0280264 A1 * | 10/2015 | Yoshimine | C01B 3/384 429/425 |

FOREIGN PATENT DOCUMENTS

| | | |
|---|---|---|
| JP | 2007-120797 | 5/2007 |
| JP | 2010-504607 | 2/2010 |
| JP | 2011-132115 | 7/2011 |
| JP | 2012-003934 | 1/2012 |

OTHER PUBLICATIONS

Japanese Office Action dated Jan. 12, 2016, with partial English translation, 5 pages.

* cited by examiner

FUEL CELL MODULE

TECHNICAL FIELD

The present invention relates to a fuel cell module including a fuel cell stack formed by stacking a plurality of fuel cells for generating electricity by electrochemical reactions of a fuel gas and an oxygen-containing gas.

BACKGROUND ART

Typically, a solid oxide fuel cell (SOFC) employs a solid electrolyte of ion-conductive oxide such as stabilized zirconia. The electrolyte is interposed between an anode and a cathode to form an electrolyte electrode assembly (hereinafter also referred to as MEA). The electrolyte electrode assembly is interposed between separators (bipolar plates). In use, generally, predetermined numbers of the electrolyte electrode assemblies and the separators are stacked together to form a fuel cell stack.

As a system including this type of fuel cell stack, for example, a fuel cell battery disclosed in Japanese Laid-Open Patent Publication No. 2001-236980 (hereinafter referred to as conventional technique 1) is known. As shown in FIG. 15, the fuel cell battery includes a fuel cell stack 1a, and a heat insulating sleeve 2a is provided at one end of the fuel cell stack 1a. A reaction device 4a is provided in the heat insulating sleeve 2a. The reaction device 4a includes a heat exchanger 3a.

In the reaction device 4a, as a treatment of liquid fuel, partial oxidation reforming which does not use water is performed. After the liquid fuel is evaporated by an exhaust gas, the liquid fuel passes through a feeding point 5a which is part of the heat exchanger 3a. The fuel contacts an oxygen carrier gas heated by the exhaust gas to induce partial oxidation reforming, and then, the fuel is supplied to the fuel cell stack 1a.

Further, as shown in FIG. 16, a solid oxide fuel cell disclosed in Japanese Laid-Open Patent Publication No. 2010-504607 (PCT) (hereinafter referred to as conventional technique 2) has a heat exchanger 2b including a cell core 1b. A cold fluid circuit CA and a hot fluid circuit HA are provided in the heat exchanger 2b. Cold fluid is supplied from an opening 3b to the cold fluid circuit CA, and hot fluid (waste heat) is supplied from a fluid outlet 4b of the cell core 1b to the hot fluid circuit HA. The heat exchanger 2b heats the cathode air as cold fluid by utilizing hot fluid.

Further, as shown in FIG. 17, a fuel cell system disclosed in Japanese Laid-Open Patent Publication No. 2004-288434 (hereinafter referred to as conventional technique 3) includes a first area 1c having a columnar shape extending vertically, and an annular second area 2c around the first area 1c, an annular third area 3c around the second area 2c, and an annular fourth area 4c around the third area 3c.

A burner 5c is provided in the first area 1c, and a reforming pipe 6c is provided in the second area 2c. A water evaporator 7c is provided in the third area 3c, and a CO shift converter 8c is provided in the fourth area 4c.

SUMMARY OF INVENTION

In the conventional technique 1, the reaction device 4a is used as an auxiliary burner at the time of starting operation. At this time, the fuel is perfectly combusted, and a combustion gas is produced. This combustion gas heats the fuel cell stack 1a. However, the combustion gas is returned a plurality of times, and supplied to the fuel cell stack 1a. Therefore, the temperature of the combustion gas tends to be lowered undesirably.

Further, in the conventional technique 2, waste heat is used for heating the cathode air supplied to the cell core 1b, and the waste heat used for heating is discharged from an exhaust gas outlet 5b immediately above the cell core 1b. Thus, after the temperature of the waste heat becomes low, the waste heat is heated by the hot fluid discharged from the fluid outlet 4b, and thus, heat losses occur in the hot fluid.

Further, in the conventional technique 3, heat insulating material 9c is provided at the bottom of the container, and the heat is excessively supplied to the heat insulating material 9c. As a result, heat losses occur.

The present invention has been made to solve the problem of this type, and an object of the present invention is to provide a fuel cell module having simple and compact structure which makes it possible to improve the heat efficiency, and facilitate thermally self-sustaining operation.

The present invention relates to a fuel cell module including a fuel cell stack formed by stacking a plurality of fuel cells for generating electricity by electrochemical reactions of a fuel gas and an oxygen-containing gas, a reformer for reforming a mixed gas of water vapor and a raw fuel chiefly containing hydrocarbon to produce the fuel gas supplied to the fuel cell stack, an evaporator for evaporating water, and supplying the water vapor to the reformer, a heat exchanger for raising a temperature of the oxygen-containing gas by heat exchange with a combustion gas, and supplying the oxygen-containing gas to the fuel cell stack, an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas, and a start-up combustor for combusting the raw fuel and the oxygen-containing gas to produce the combustion gas.

The fuel cell module includes a first area where the exhaust gas combustor and the start-up combustor are provided, an annular second area around the first area where one of the reformer and the heat exchanger is provided, an annular third area around the second area where another of the reformer and the heat exchanger is provided, an annular fourth area around the third area where the evaporator is provided, and a partition member provided between the first area and the second area. The partition member has a combustion gas hole for allowing the combustion gas to flow from the first area to the second area.

The exhaust gas combustor and the start-up combustor are provided coaxially inside the partition member, and a combustion gas flow limiting member is provided between the exhaust gas combustor and the start-up combustor for limiting flow of the combustion gas from the exhaust gas combustor to the start-up combustor or flow of the combustion gas from the start-up combustor to the exhaust gas combustor.

In the present invention, the exhaust gas combustor and the start-up combustor are provided in the first area. The first area is provided at the center, and the annular second area, the annular third area, and the annular fourth area are provided around the first area, successively. In the structure, high temperature equipment with a large heat demand can be provided inside, and low temperature equipment with a small heat demand can be provided outside. Thus, improvement in the heat efficiency is achieved, and thermally self-sustaining operation is facilitated. Further, simple and compact structure is achieved.

Further, in the first area, the exhaust gas combustor and the start-up combustor are provided coaxially through the partition member. In the structure, the heat emitting portions are locally concentrated at the center of the FC peripheral equipment. Accordingly, improvement in the heat efficiency is achieved, and thermally self-sustaining operation is facilitated. Moreover, if flame-out occurs in the exhaust gas combustor, combustion is assisted by the start-up combustor, and improvement in the stability of the thermally self-sustaining operation is achieved suitably.

Further, since the combustion gas flow limiting member is provided inside the partition member, the exhaust gas combustor and the start-up combustor are not exposed to the combustion gas unnecessarily, and improvement in the durability is achieved easily. Further, it becomes possible to suppress heat dissipation (heat radiation) from the exhaust gas combustor and the start-up combustor. Accordingly, improvement in the heat efficiency is achieved, and thermally self-sustaining operation is facilitated.

DESCRIPTION OF EMBODIMENTS

Figure 1:
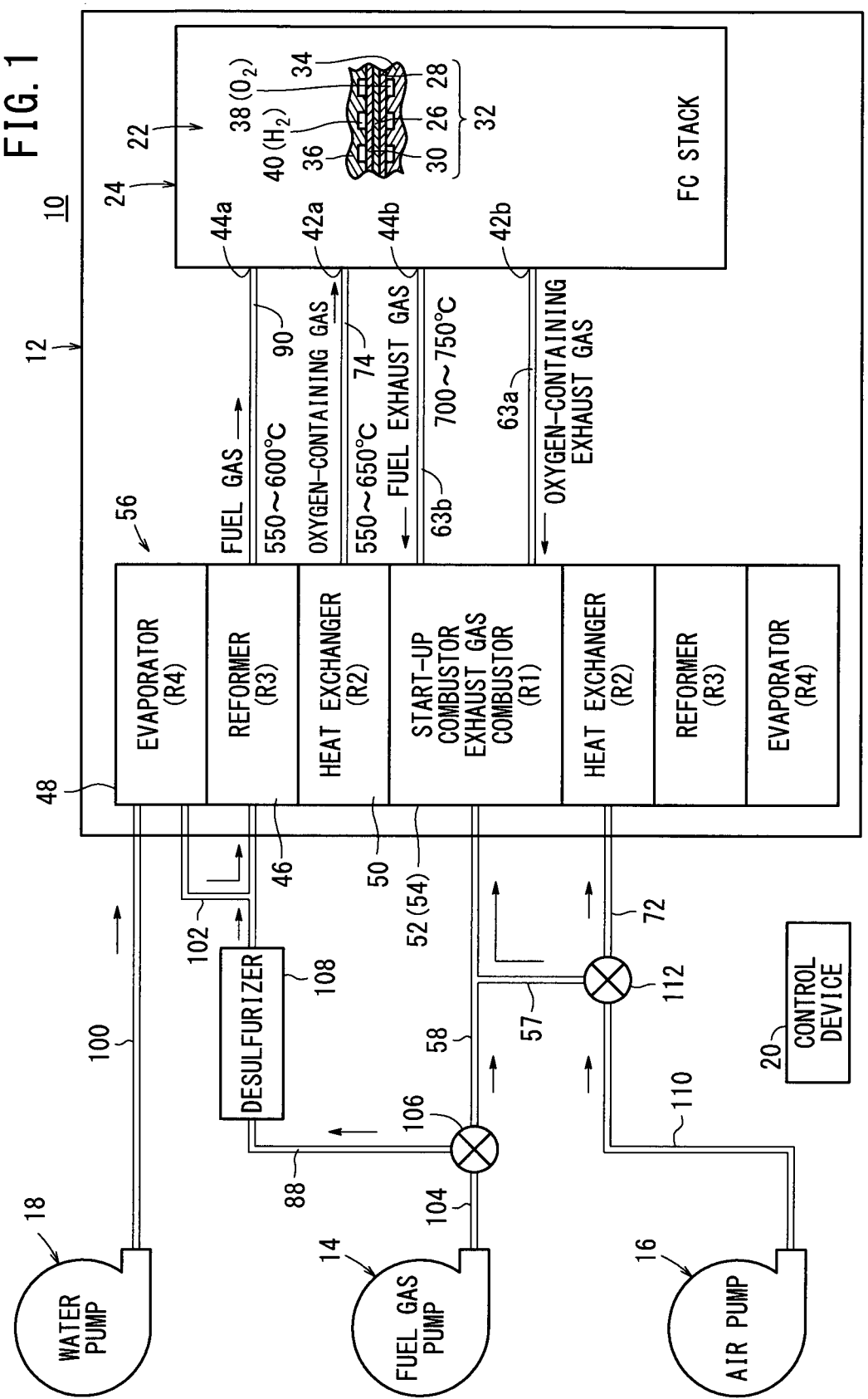
FIG. 1 is a diagram schematically showing structure of a fuel cell system including a fuel cell module according to a first embodiment of the present invention.

As shown in FIG. 1, a fuel cell system 10 includes a fuel cell module 12 according to a first embodiment of the present invention, and the fuel cell system 10 is used in various applications, including stationary and mobile applications. For example, the fuel cell system 10 is mounted on a vehicle.

The fuel cell system 10 includes the fuel cell module (SOFC module) 12 for generating electrical energy in power generation by electrochemical reactions of a fuel gas (a gas produced by mixing a hydrogen gas, methane, and carbon monoxide) and an oxygen-containing gas (air), a raw fuel supply apparatus (including a fuel gas pump) 14 for supplying a raw fuel (e.g., city gas) to the fuel cell module 12, an oxygen-containing gas supply apparatus (including an air pump) 16 for supplying the oxygen-containing gas to the fuel cell module 12, a water supply apparatus (including a water pump) 18 for supplying water to the fuel cell module 12, and a control device 20 for controlling the amount of electrical energy generated in the fuel cell module 12.

The fuel cell module 12 includes a fuel cell stack 24 formed by stacking a plurality of solid oxide fuel cells 22 in a vertical direction (or horizontal direction). The fuel cell 22 includes an electrolyte electrode assembly (MEA) 32. The electrolyte electrode assembly 32 includes a cathode 28, an anode 30, and an electrolyte 26 interposed between the cathode 28 and the anode 30. For example, the electrolyte 26 is made of ion-conductive oxide such as stabilized zirconia.

A cathode side separator 34 and an anode side separator 36 are provided on both sides of the electrolyte electrode assembly 32. An oxygen-containing gas flow field 38 for supplying the oxygen-containing gas to the cathode 28 is formed in the cathode side separator 34, and a fuel gas flow field 40 for supplying the fuel gas to the anode 30 is formed in the anode side separator 36. As the fuel cell 22, various types of conventional SOFCs can be adopted.

The operating temperature of the fuel cell 22 is high, at several hundred ° C. Methane in the fuel gas is reformed at the anode 30 to obtain hydrogen and CO, and the hydrogen and CO are supplied to a portion of the electrolyte 26 adjacent to the anode 30.

An oxygen-containing gas supply passage 42$a$, an oxygen-containing gas discharge passage 42$b$, a fuel gas supply passage 44$a$, and a fuel gas discharge passage 44$b$ extend through the fuel cell stack 24. The oxygen-containing gas supply passage 42$a$ is connected to an inlet of each oxygen-containing gas flow field 38, the oxygen-containing gas discharge passage 42$b$ is connected to an outlet of each oxygen-containing gas flow field 38, the fuel gas supply passage 44$a$ is connected to an inlet of each fuel gas flow field 40, and the fuel gas discharge passage 44$b$ is connected to an outlet of each fuel gas flow field 40.

The fuel cell module 12 includes a reformer 46 for reforming a mixed gas of water vapor and a raw fuel chiefly containing hydrocarbon (e.g., city gas) to produce a fuel gas supplied to the fuel cell stack 24, an evaporator 48 for evaporating water and supplying the water vapor to the reformer 46, a heat exchanger 50 for raising the temperature of the oxygen-containing gas by heat exchange with a combustion gas, and supplying the oxygen-containing gas to the fuel cell stack 24, an exhaust gas combustor 52 for combusting the fuel gas discharged from the fuel cell stack 24 as a fuel exhaust gas and the oxygen-containing gas discharged from the fuel cell stack 24 as an oxygen-containing exhaust gas to produce the combustion gas, and a start-up combustor 54 for combusting the raw fuel and the oxygen-containing gas to produce the combustion gas.

Basically, the fuel cell module 12 is made up of the fuel cell stack 24 and FC (fuel cell) peripheral equipment 56. The FC peripheral equipment 56 includes the reformer 46, the evaporator 48, the heat exchanger 50, the exhaust gas combustor 52, and the start-up combustor 54.

Figure 2:
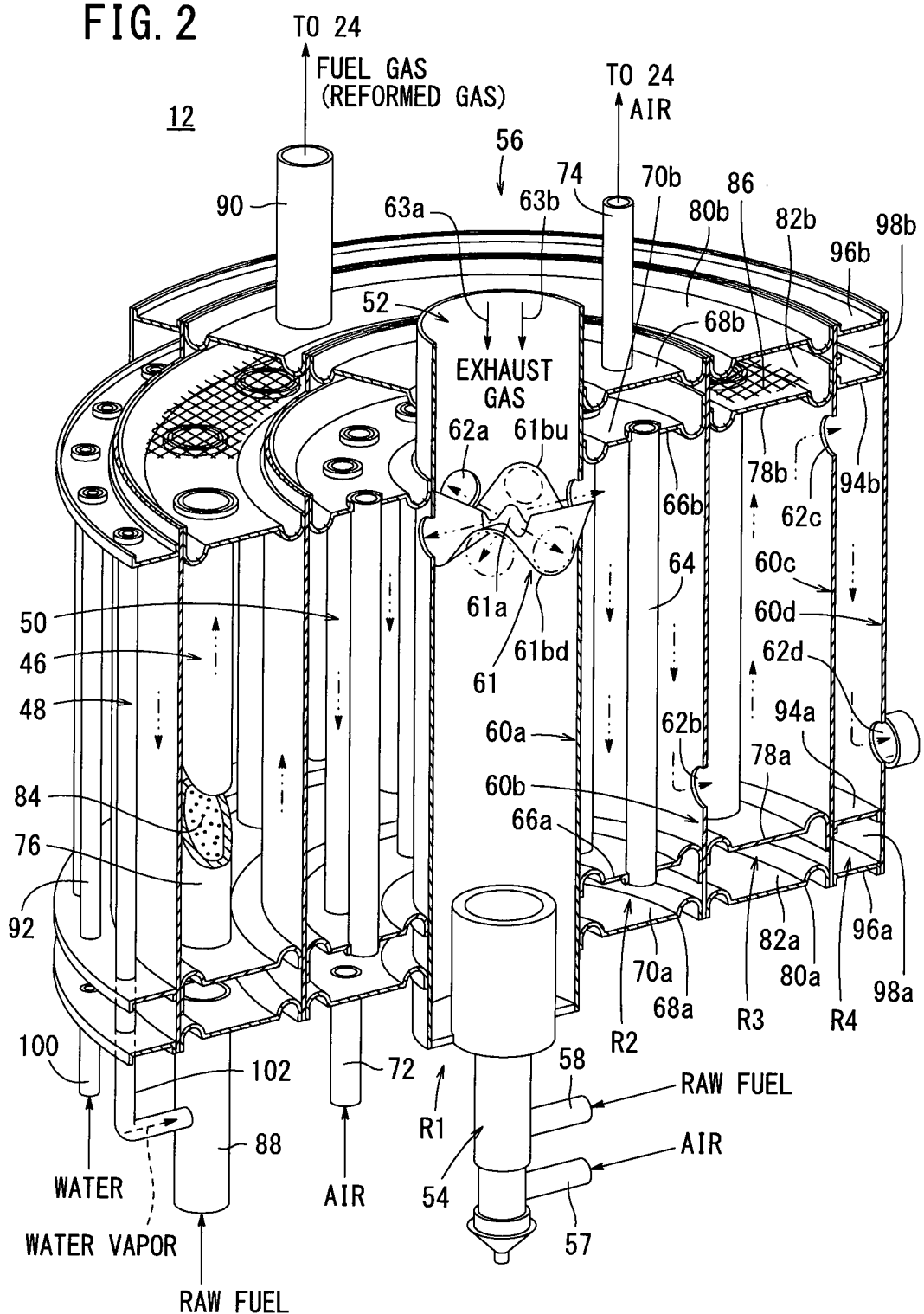
FIG. 2 is a perspective view with partial omission showing FC peripheral equipment of the fuel cell module.

As shown in FIG. 2, the FC peripheral equipment 56 includes a first area R1 comprising, e.g., a circular opening where the exhaust gas combustor 52 and the start-up combustor 54 are provided, an annular second area R2 formed around the first area R1 where the heat exchanger 50 is provided, an annular third area R3 formed around the second area R2 where the reformer 46 is provided, and an annular fourth area R4 formed around the third area R3 where the evaporator 48 is provided.

Figure 3:
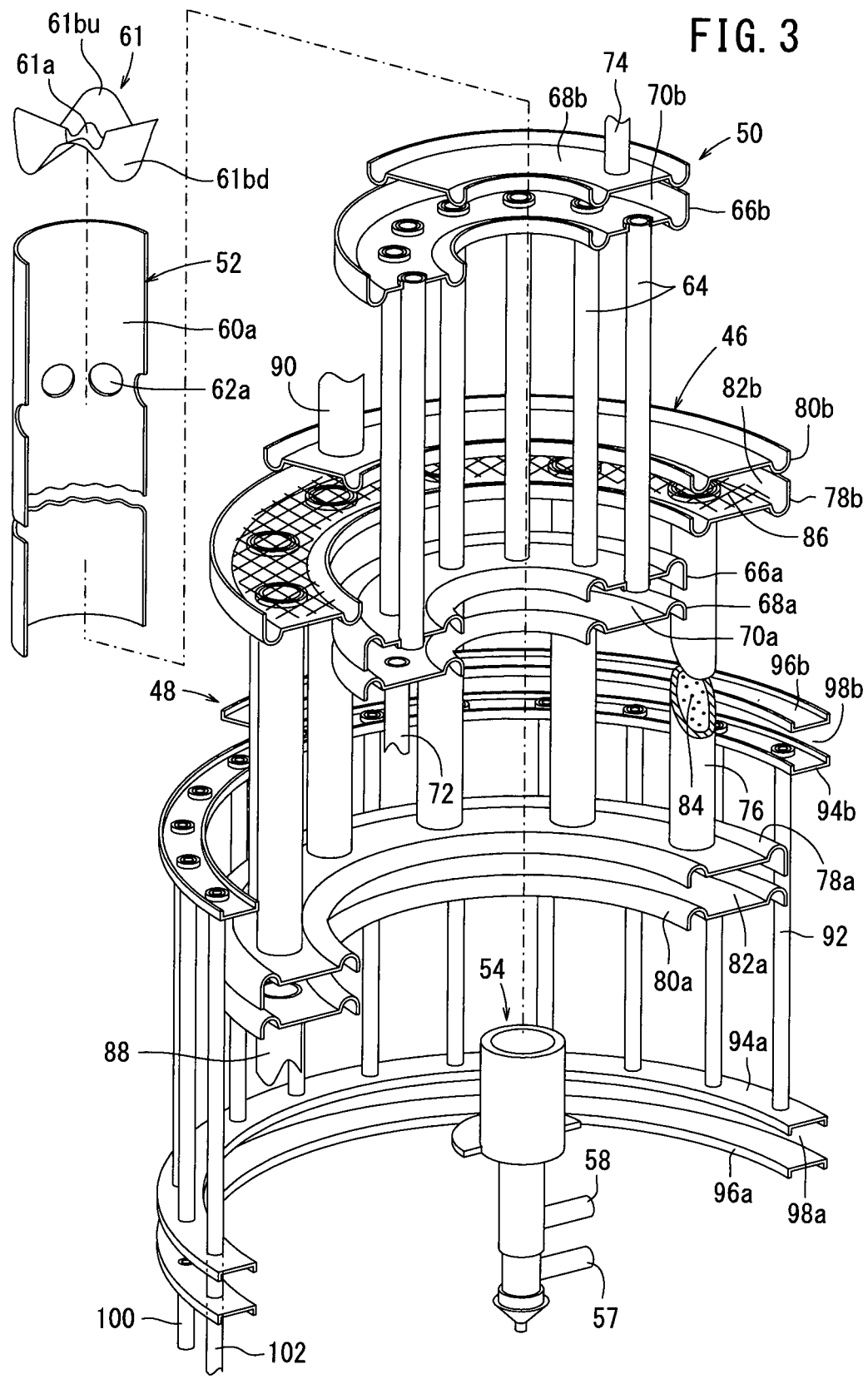
FIG. 3 is an exploded perspective view showing main components of the FC peripheral equipment.

As shown in FIGS. 2 and 3, the start-up combustor 54 includes an air supply pipe 57 and a raw fuel supply pipe 58. The start-up combustor 54 has an ejector function, and generates negative pressure in the raw fuel supply pipe 58 by the flow of the air supplied from the air supply pipe 57 for sucking the raw fuel.

Figure 4:
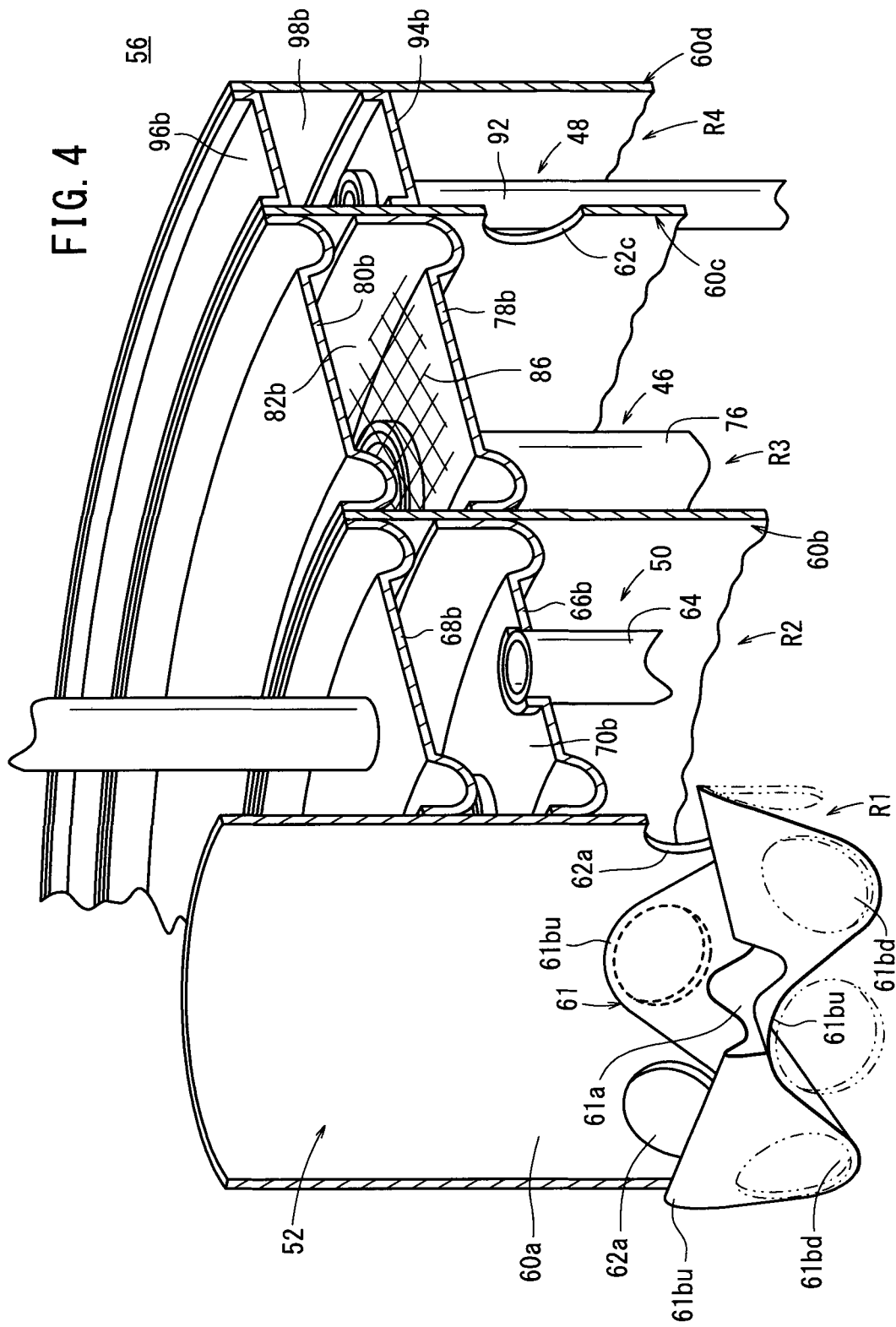
FIG. 4 is an enlarged perspective view showing main components of the FC peripheral equipment.

As shown in FIGS. 2 and 4, the FC peripheral equipment 56 includes a first partition plate (partition member) 60a provided between the first area R1 and the second area R2, a second partition plate 60b provided between the second area R2 and the third area R3, and a third partition plate 60c provided between the third area R3 and the fourth area R4. A fourth partition plate 60d is provided around the fourth area R4.

As shown in FIGS. 2 and 3, the exhaust gas combustor 52 is provided coaxially inside the first partition plate 60a containing the start-up combustor 54. The first partition plate 60a has a cylindrical shape. A plurality of first combustion gas holes 62a are formed along the outer circumferential portion of the first partition plate 60a, adjacent to an end of the first partition plate 60a closer to the fuel cell stack 24. The first combustion gas holes 62a allows the combustion gas to flow from the first area R1 to the second area R2.

A baffle circular member 61 is provided inside the first partition plate 60a, between the exhaust gas combustor 52 and the start-up combustor 54. In the first embodiment, the baffle circular member 61 is provided adjacent to the first combustion gas holes 62a. The baffle circular member 61 functions as a combustion gas flow limit member for limiting the flow of the combustion gas from the exhaust gas combustor 52 to the start-up combustor 54, and limiting the flow of the combustion gas from the start-up combustor 54 to the exhaust gas combustor 52.

Figure 5:
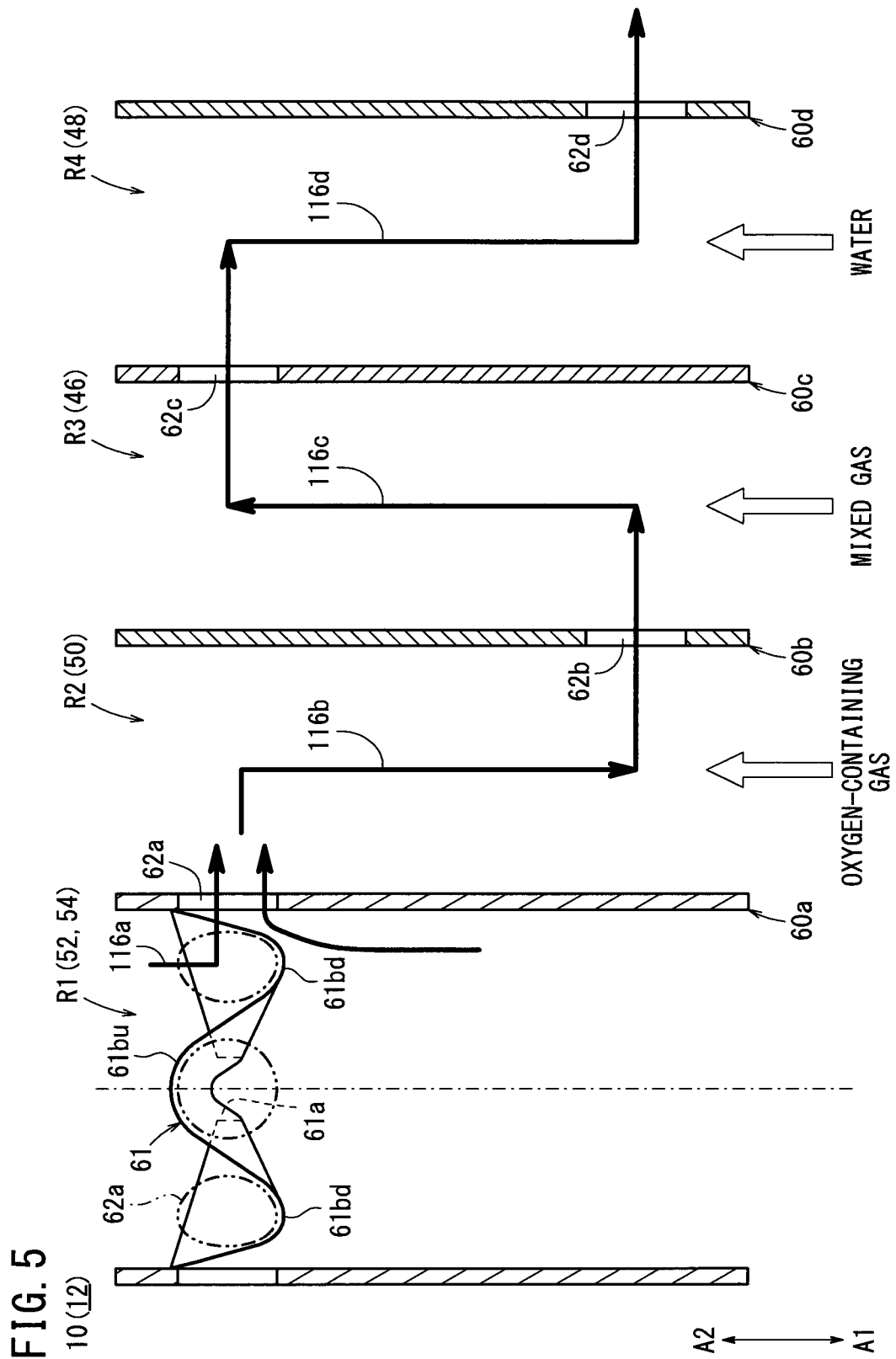
FIG. 5 is a view showing gas flows of a combustion gas in the FC peripheral equipment.
Figure 6:
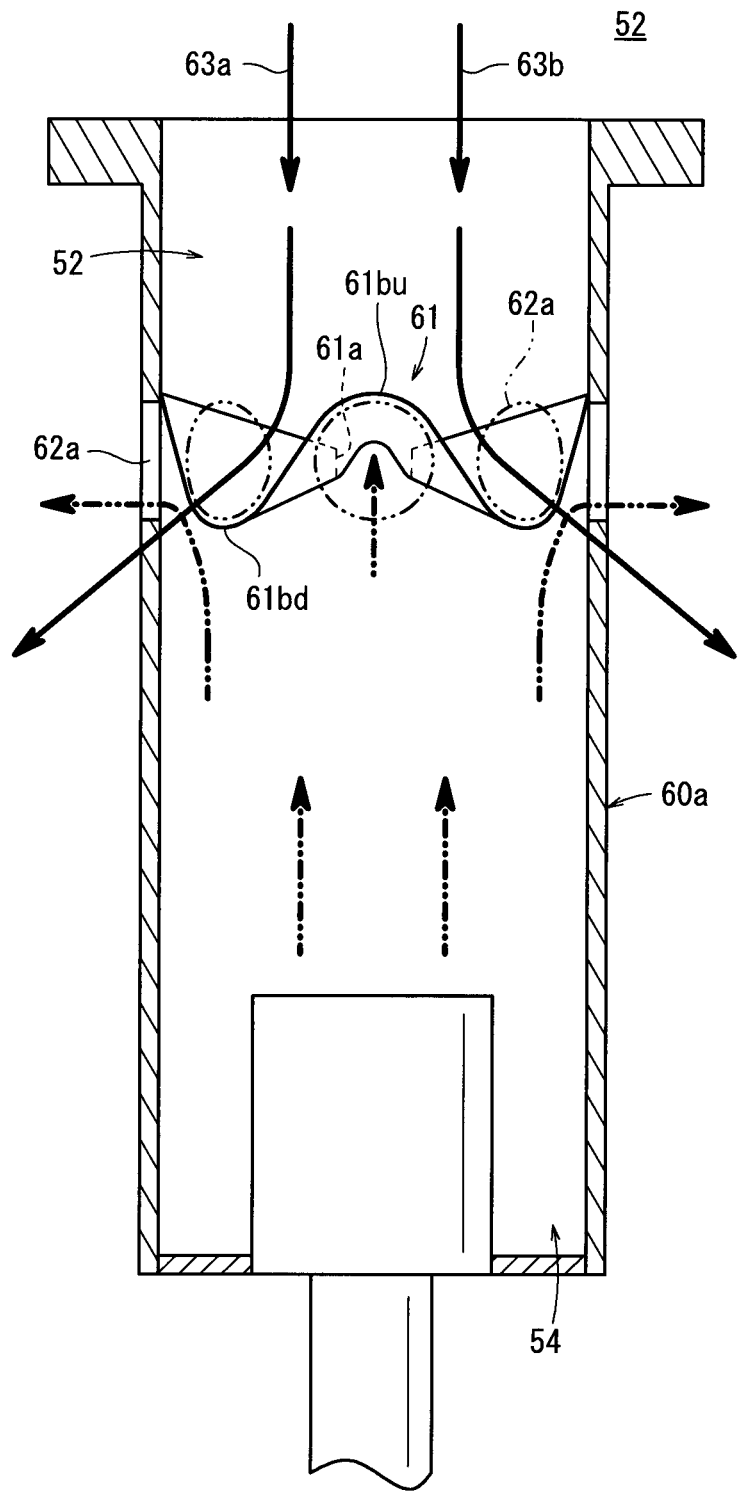
FIG. 6 is a cross sectional view showing main components of the fuel cell module.

As shown in FIGS. 2 to 6, a combustion gas flow hole 61a is formed at the center of the baffle circular member 61. The baffle circular member 61 is made of heat resistant metal such as nickel based heat resistant alloy. As shown in FIGS. 5 and 6, the baffle circular member 61 is curved in a corrugated shape in a side view (as viewed from the plate thickness direction), and the outer circumference of the baffle circular member 61 is fixed to the inner circumferential surface of the first partition plate 60a by welding or the like. Lower end sections 61bd each having a downward curve and upper top sections 61bu each having an upward curve are provided alternately in the outer circumference of the baffle circular member 61.

The lower end sections 61bd are positioned below the first combustion gas holes 62a, and connect the first combustion gas holes 62a to the exhaust gas combustor 52. The upper top sections 61bu are positioned above the first combustion gas holes 62a, and connect the first combustion gas holes 62a to the start-up combustor 54.

As shown in FIGS. 2 and 5, a plurality of second combustion gas holes 62b are formed adjacent to an end of the second partition plate 60b opposite to the fuel cell stack 24. A plurality of third combustion gas holes 62c are formed adjacent to an end of the third partition plate 60c closer to the fuel cell stack 24. A plurality of fourth combustion gas holes 62d are formed adjacent to an end of the fourth partition plate 60d opposite to the fuel cell stack 24. The combustion gas is discharged to the outside through the fourth combustion gas holes 62d.

One end of an oxygen containing exhaust gas channel 63a and one end of an fuel exhaust gas channel 63b are provided at the first partition plate 60a. The combustion gas is produced inside the first partition plate 60a by combustion reaction of the fuel gas (specifically, fuel exhaust gas) and the oxygen-containing gas (specifically, oxygen-containing exhaust gas).

As shown in FIG. 1, the other end of the oxygen-containing exhaust gas channel 63a is connected to the oxygen-containing gas discharge passage 42b of the fuel cell stack 24, and the other end of the fuel exhaust gas channel 63b is connected to the fuel gas discharge passage 44b of the fuel cell stack 24.

As shown in FIGS. 2 and 3, the heat exchanger 50 includes a plurality of heat exchange pipes (heat transmission pipes) 64 provided around the first partition plate 60a. The heat exchange pipes 64 are fixed to a first inner ring 66a at one end (the end opposite to the fuel cell stack 24: hereinafter, in the same manner, the end opposite to the fuel cell stack 24 is referred to as one end), and the heat exchange pipes 64 are fixed to a first inner ring 66b at the other end (the end closer to the fuel cell stack 24: hereinafter, in the same manner, the end closer to the fuel cell stack 24 is referred to as the other end).

A first outer ring 68a is provided outside the first inner ring 66a, and a first outer ring 68b is provided outside the first inner ring 66b. The first inner rings 66a, 66b and the first outer rings 68a, 68b are fixed to the outer circumferential surface of the first partition plate 60a and the inner circumference surface of the second partition plate 60b.

An annular oxygen-containing gas supply chamber 70a is formed between the first inner ring 66a and the first outer ring 68a, and the oxygen-containing gas is supplied to the oxygen-containing gas supply chamber 70a. An annular oxygen-containing gas discharge chamber 70b is formed between the first inner ring 66b and the first outer ring 68b, and the heated oxygen-containing gas is discharged to the oxygen-containing gas discharge chamber 70b (see FIGS. 2 to 4). Both ends of each of the heat exchange pipes 64 are opened to the oxygen-containing gas supply chamber 70a and the oxygen-containing gas discharge chamber 70b.

An oxygen-containing gas supply pipe 72 is provided in the oxygen-containing gas supply chamber 70a. One end of an oxygen-containing gas channel 74 is connected to the oxygen-containing gas discharge chamber 70b, and the other end of the oxygen-containing gas channel 74 is connected to the oxygen-containing gas supply passage 42a of the fuel cell stack 24 (see FIG. 1).

The reformer 46 is a preliminary reformer for reforming higher hydrocarbon ($C_{2+}$) such as ethane ($C_2H_6$), propane ($C_3H_8$), and butane ($C_4H_{10}$) in the city gas (raw fuel) to produce the fuel gas chiefly containing methane ($CH_4$), hydrogen, and CO by steam reforming. The operating temperature of the reformer 46 is several hundred ° C.

As shown in FIGS. 2 and 3, the reformer 46 includes a plurality of reforming pipes (heat transmission pipes) 76 provided around the heat exchanger 50. The reforming pipes 76 are fixed to the second inner ring 78a at one end, and fixed to the second inner ring 78b at the other end.

A second outer ring 80a is provided outside the second inner ring 78a, and a second outer ring 80b is provided outside the second inner ring 78b. The second inner rings 78a, 78b and the second outer rings 80a, 80b are fixed to the outer circumferential surface of the second partition plate 60b and the inner circumferential surface of the third partition plate 60c.

An annular mixed gas supply chamber 82a is formed between the second inner ring 78a and the second outer ring 80a, and a mixed gas of raw fuel and water vapor is supplied to the mixed gas supply chamber 82a. An annular reformed gas discharge chamber 82b is formed between the second inner ring 78b and the second outer ring 80b, and the produced fuel gas (reformed gas) is discharged to the reformed gas discharge chamber 82b.

Both ends of each of the reforming pipes 76 are opened to the mixed gas supply chamber 82a and the reformed gas discharge chamber 82b. The inside of each of the reforming pipes 76 is filled with reforming catalyst pellets 84. Metal meshes 86 are provided at both ends of the reforming pipes 76 for holding the catalyst pellets 84.

A raw fuel supply channel 88 is connected to the mixed gas supply chamber 82a, and an evaporation return pipe 102 as described later is connected to a position in the middle of the raw fuel supply channel 88. One end of a fuel gas channel 90 is connected to the reformed gas discharge chamber 82b, and the other end of the fuel gas channel 90 is connected to the fuel gas supply passage 44a of the fuel cell stack 24 (see FIG. 1).

The evaporator 48 includes a plurality of evaporation pipes (heat transmission pipes) 92 provided around the reformer 46. The evaporation pipes 92 are fixed to the third inner ring 94a at one end, and fixed to the third inner ring 94b at the other end.

A third outer ring 96a is provided outside the third inner ring 94a, and a third outer ring 96b is provided outside the third inner ring 94b. The third inner rings 94a, 94b and the third outer rings 96a, 96b are fixed to the outer circumferential surface of the third partition plate 60c and the inner circumferential surface of the fourth partition plate 60d.

An annular water supply chamber 98a is formed between the third inner ring 94a and the third outer ring 96a, and water is supplied to the water supply chamber 98a. An annular water vapor discharge chamber 98b is formed between the third inner ring 94b and the third outer ring 96b, and water vapor is discharged to the water vapor discharge chamber 98b. Both ends of the evaporation pipes 92 are opened to the water supply chamber 98a and the water vapor discharge chamber 98b.

A water channel 100 is connected to the water supply chamber 98a. One end of the evaporation return pipe 102 having at least one evaporation pipe 92 is provided in the water vapor discharge chamber 98b, and the other end of the evaporation return pipe 102 is connected to a position in the middle of the raw fuel supply channel 88 (see FIG. 1). The raw fuel supply channel 88 has an ejector function, and generates negative pressure by the flow of the raw fuel for sucking the water vapor.

As shown in FIG. 1, the raw fuel supply apparatus 14 includes a raw fuel channel 104. The raw fuel channel 104 is branched into the raw fuel supply channel 88 and the raw fuel supply pipe 58 through a raw fuel regulator valve 106. A desulfurizer 108 for removing sulfur compounds in the city gas (raw fuel) is provided in the raw fuel supply channel 88.

The oxygen-containing gas supply apparatus 16 includes an oxygen-containing gas channel 110. The oxygen-containing gas channel 110 is branched into the oxygen-containing gas supply pipe 72 and the air supply pipe 57 through an oxygen-containing gas regulator valve 112. The water supply apparatus 18 is connected to the evaporator 48 through the water channel 100.

As schematically shown in FIG. 5, a first combustion gas channel 116a as a passage of the combustion gas is formed in the first area R1, a second combustion gas channel 116b as a passage of the combustion gas in a direction indicated by an arrow A1 is formed in the second area R2, a third combustion gas channel 116c as a passage of the combustion gas in a direction indicated by an arrow A2 is formed in the third area R3, and a fourth combustion gas channel 116d as a passage of the combustion gas in the direction indicated by the arrow A1 is formed in the fourth area R4.

Next, operation of the fuel cell system 10 will be described below.

At the time of starting operation of the fuel cell system 10, the air (oxygen-containing gas) and the fuel gas are supplied to the start-up combustor 54. Specifically, in the oxygen-containing gas supply apparatus 16, by operation of the air pump, air is supplied to the oxygen-containing gas channel 110. By adjusting the opening angle of the oxygen-containing gas regulator valve 112, the air is supplied to the air supply pipe 57.

In the meanwhile, in the raw fuel supply apparatus 14, by operation of the fuel gas pump, for example, raw fuel such as the city gas (containing $CH_4$, $C_2H_8$, $C_3H_8$, $C_4H_{10}$) is supplied to the raw fuel channel 104. By regulating the opening angle of the raw fuel regulator valve 106, the raw fuel is supplied into the raw fuel supply pipe 58. The raw fuel is mixed with the air, and supplied into the start-up combustor 54 (see FIG. 2).

Thus, the mixed gas of the raw fuel and the air is supplied into the start-up combustor 54, and the mixed gas is ignited to start combustion. Therefore, the combustion gas supplied from the start-up combustor 54 flows into the first partition plate 60a. As shown in FIG. 5, the plurality of first combustion gas holes 62a are formed at the end of the first partition plate 60a closer to the fuel cell stack 24. The baffle circular member 61 is provided adjacent to the first combustion gas holes 62a.

In the structure, the combustion gas supplied into the first partition plate 60a flows through the first combustion gas holes 62a provided corresponding to the upper top sections 61bu of the baffle circular member 61, and the combustion gas is supplied from the first area R1 to the second area R2.

In the second area R2, the combustion gas flows in the direction indicated by the arrow A1, and then, the combustion gas flows through the second combustion gas holes 62b formed in the second partition plate 60b into the third area R3. In the third area R3, the combustion gas flows in the direction indicated by the arrow A2, and then, the combustion gas flows through the third combustion gas holes 62c formed in the third partition plate 60c into the fourth area R4. In the fourth area R4, the combustion gas flows in the direction indicated by the arrow A1, and then, the combustion gas is discharged to the outside from the fourth combustion gas holes 62d formed in the fourth partition plate 60d.

The heat exchanger 50 is provided in the second area R2, the reformer 46 is provided in the third area R3, and the evaporator 48 is provided in the fourth area R4. Thus, the combustion gas discharged from the first area R1 heats the heat exchanger 50, then, heats the reformer 46, and then, heats the evaporator 48.

Then, after the temperature of the fuel cell module 12 is raised to a predetermined temperature, the oxygen-containing gas is supplied to the heat exchanger 50, and the mixed gas of the raw fuel and the water vapor is supplied to the reformer 46.

Specifically, the opening angle of the oxygen-containing gas regulator valve 112 is adjusted such that the flow rate of the air supplied to the oxygen-containing gas supply pipe 72 is increased, and the opening angle of the raw fuel regulator valve 106 is adjusted such that the flow rate of the raw fuel supplied to the raw fuel supply channel 88 is increased. Further, by operation of the water supply apparatus 18, the water is supplied to the water channel 100.

Thus, as shown in FIGS. 2 and 3, the air which flowed into the heat exchanger 50 is temporarily supplied to the oxygen-containing gas supply chamber 70a. While the air is moving inside the heat exchange pipes 64, the air is heated by heat exchange with the combustion gas supplied into the second area R2. After the heated air is temporarily supplied to the oxygen-containing gas discharge chamber 70b, the air is supplied to the oxygen-containing gas supply passage 42a of the fuel cell stack 24 through the oxygen-containing gas channel 74 (see FIG. 1).

In the fuel cell stack 24, after the heated air flows through the oxygen-containing gas flow field 38, the oxygen-containing gas is discharged from the oxygen-containing gas discharge passage 42b into the oxygen-containing exhaust gas channel 63a. The oxygen-containing exhaust gas channel 63a is opened to the inside of the first partition plate 60a of the exhaust gas combustor 52, and the oxygen-containing exhaust gas flows into the first partition plate 60a.

Further, as shown in FIG. 1, the water from the water supply apparatus 18 is supplied to the evaporator 48. After sulfur is removed from the raw fuel at the desulfurizer 108, the raw fuel flows through the raw fuel supply channel 88, and moves toward the reformer 46.

In the evaporator 48, after the water is temporarily supplied to the water supply chamber 98a, while water is moving inside the evaporation pipes 92, the water is heated by the combustion gas flowing through the fourth area R4, and vaporized. After the water vapor flows into the water vapor discharge chamber 98b, the water vapor is supplied to the evaporation return pipe 102 connected to the water vapor discharge chamber 98b. Thus, the water vapor flows inside the evaporation return pipe 102, and flows into the raw fuel supply channel 88. Then, the water vapor is mixed with the raw fuel to produce the mixed gas.

The mixed gas from the raw fuel supply channel 88 is temporarily supplied to the mixed gas supply chamber 82a of the reformer 46. The mixed gas moves inside the reforming pipes 76. In the meanwhile, the mixed gas is heated by the combustion gas flowing through the third area R3. By the catalyst pellets 84, steam reforming is performed. After removal (reforming) of hydrocarbon of $C_{2+}$, a reformed gas chiefly containing methane is obtained.

After this reformed gas is heated, the reformed gas is temporarily supplied to the reformed gas discharge chamber 82b as the fuel gas. Thereafter, the fuel gas is supplied to the fuel gas supply passage 44a of the fuel cell stack 24 through the fuel gas channel 90 (see FIG. 1).

In the fuel cell stack 24, after the heated fuel gas flows through the fuel gas flow field 40, the fuel gas is discharged from the fuel gas discharge passage 44b into the fuel exhaust gas channel 63b. The fuel exhaust gas channel 63b is opened to the inside of the first partition plate 60a of the exhaust gas combustor 52, and the fuel exhaust gas is supplied into the first partition plate 60a.

Under the heating operation by the start-up combustor 54, when the temperature of the fuel gas in the exhaust gas combustor 52 exceeds the self-ignition temperature, combustion of the oxygen-containing exhaust gas and the fuel exhaust gas is started inside the first partition plate 60a.

The combustion gas produced by combustion of the oxygen-containing exhaust gas and the fuel exhaust gas flows through the first combustion gas holes 62a provided corresponding to the lower end sections 61bd of the baffle circular member 61, and the combustion gas is supplied from the first area R1 to the second area R2.

In the first embodiment, the FC peripheral equipment 56 includes the first area R1 where the exhaust gas combustor 52 and the start-up combustor 54 are provided, the annular second area R2 around the first area R1 where the heat exchanger 50 is provided, the annular third area R3 around the second area R2 where the reformer 46 is provided, and the annular fourth area R4 around the third area R3 where the evaporator 48 is provided.

That is, the first area R1 is provided at the center, and the annular second area R2, the annular third area R3, and the annular fourth area R4 are provided around the first area R1, successively. In the structure, high temperature equipment with a large heat demand such as the heat exchanger 50 (and the reformer 46) can be provided inside, and low temperature equipment with a small heat demand such as the evaporator 48 can be provided outside.

For example, the heat exchanger 50 requires the temperature in a range of 550° C. to 650° C., and the reformer 46 requires the temperature in a range of 550° C. to 600° C. The evaporator 48 requires the temperature in a range of 150° C. to 200° C.

Thus, improvement in the heat efficiency is achieved, and thermally self-sustaining operation is facilitated. Further, simple and compact structure is achieved. In particular, since the heat exchanger 50 is provided inside the reformer 46, in an environment where the A/F (air/fuel) ratio is relatively low, the reformer 46 suitable for reforming at low temperature can be used advantageously.

Further, in the first area R1, the exhaust gas combustor 52 and the start-up combustor 54 are provided coaxially through the first partition plate 60a. In the structure, the heat emitting portions are locally concentrated at the center of the FC peripheral equipment 56. Accordingly, improvement in the heat efficiency is achieved, and thermally self-sustaining operation is facilitated. Moreover, if flame-out occurs in the exhaust gas combustor 52, combustion is assisted by the start-up combustor 54, and improvement in the stability of the thermally self-sustaining operation is achieved suitably.

Further, the baffle circular member 61 is provided inside the first partition plate 60a, adjacent to the first combustion gas holes 62a. The baffle circular member 61 includes the lower end sections 61bd and the upper top sections 61bu that are provided alternately. The lower end sections 61bd connect the first combustion gas holes 62a to the exhaust gas combustor 52, and the upper top sections 61bu connect the first combustion gas holes 62a to the start-up combustor 54.

In the structure, the baffle circular member 61 can limit the flow of the combustion gas from the exhaust gas combustor 52 to the start-up combustor 54, and limit the flow of the combustion gas from the start-up combustor 54 to the exhaust gas combustor 52. The exhaust gas combustor 52 and the start-up combustor 54 are not exposed to the combustion gas unnecessarily, and improvement in the durability is achieved easily. Further, it becomes possible to suppress heat dissipation (heat radiation) from the exhaust gas combustor 52 and the start-up combustor 54. Accordingly, improvement in the heat efficiency is achieved, and thermally self-sustaining operation is facilitated.

For example, the combustion gas produced in the exhaust gas combustor 52 contacts the baffle circular member 61, and the produced gas is suitably guided into the first combustion gas holes 62a (see FIG. 6).

Therefore, unlike the case of structure where the baffle circular member 61 is not used, heat radiation when the combustion gas moves from one end to the other end of the first partition plate 60a, i.e., moves back (return) to the start-up combustor 54 is avoided. Thus, heat radiation of the combustion gas produced in the exhaust gas combustor 52 is suppressed suitably, and the desired high temperature state is maintained. In this state, the combustion gas can move to the second area R2.

Further, the exhaust gas combustor 52 is provided adjacent to one end of the first partition plate 60a closer to the fuel cell stack 24, and the start-up combustor 54 is provided adjacent to the other end of the first partition plate 60a opposite to the fuel cell stack 24.

In the structure, the exhaust gas from the fuel cell stack 24 is combusted by the exhaust gas combustor 52 while the decrease in the temperature is minimized, and supplied to the heat exchanger 50, the reformer 46, and the evaporator 48 of the FC peripheral equipment 56. Accordingly, improvement in the heat efficiency is achieved, and thermally self-sustaining operation is facilitated. Thermally self-sustaining operation herein means operation where the operating temperature of the fuel cell 22 is maintained using only heat energy generated in the fuel cell 22, without supplying additional heat from the outside.

Further, at the first partition plate 60a, the baffle circular member 61 is provided adjacent to the first combustion gas holes 62a. In the structure, it becomes possible to guide the combustion gas to the first combustion gas holes 62a while limiting the flow of the combustion gas from the exhaust gas combustor 52 to the start-up combustor 54, and limiting the flow of the combustion gas from the start-up combustor 54 to the exhaust gas combustor 52.

Therefore, the exhaust gas combustor 52 and the start-up combustor 54 are not exposed to the combustion gas unnecessarily, and improvement in the durability is achieved easily. Further, it becomes possible to suppress heat dissipation (heat radiation) from the exhaust gas combustor 52 and the start-up combustor 54. Accordingly, improvement in the heat efficiency is achieved, and thermally self-sustaining operation is facilitated.

Further, the combustion gas flow hole 61a is formed in the baffle circular member 61 for passing the combustion gas. Therefore, the exhaust gas combustor 52 and the start-up combustor 54 are not exposed to the combustion gas unnecessarily, and improvement in the durability is achieved easily. Further, it becomes possible to suppress heat dissipation (heat radiation) from the exhaust gas combustor 52 and the start-up combustor 54. Accordingly, improvement in the heat efficiency is achieved, and thermally self-sustaining operation is facilitated. Moreover, if flame-out occurs in the exhaust gas combustor 52, combustion is assisted by the start-up combustor 54, and improvement in the stability of the thermally self-sustaining operation is achieved suitably.

Further, the fuel cell module 12 is a solid oxide fuel cell module. Therefore, the fuel cell module 12 is most suitable as high temperature type fuel cells such as SOFC.

Figure 7:
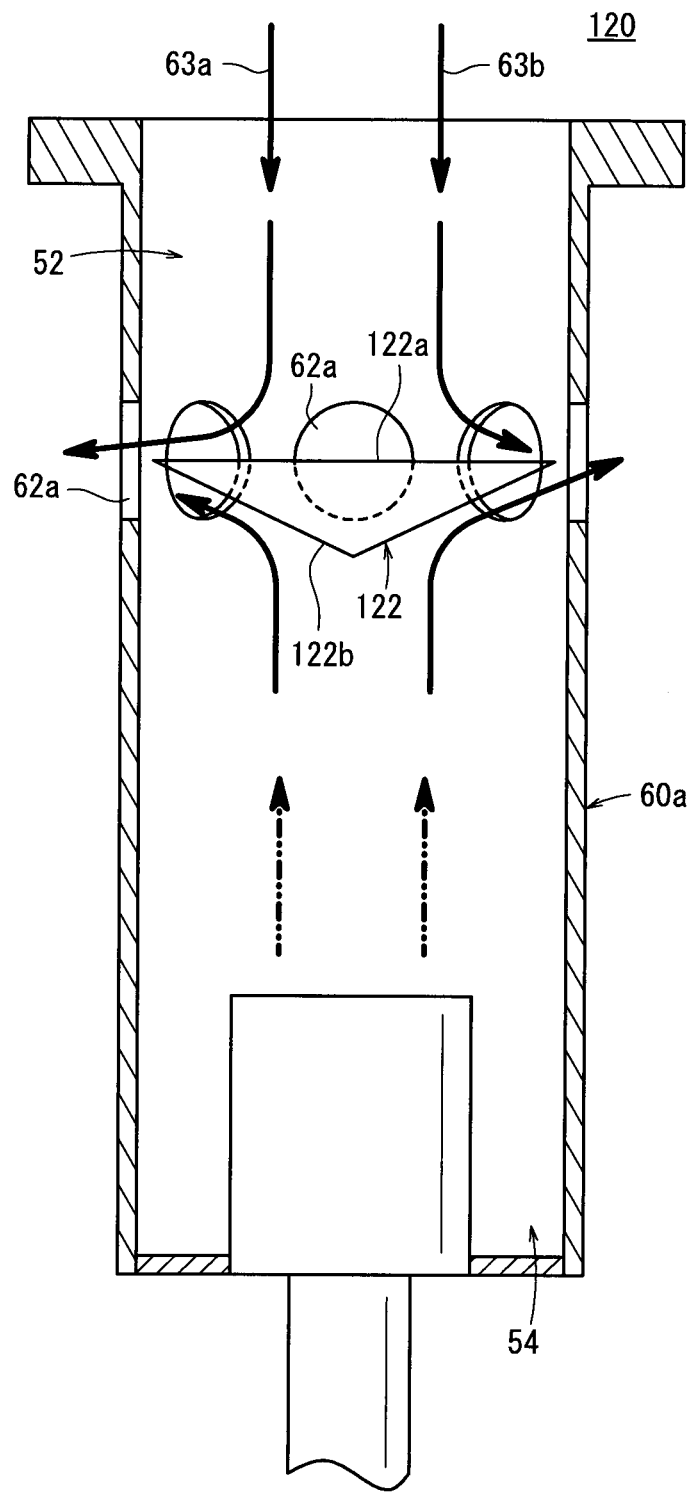
FIG. 7 is a cross sectional view showing main components of a fuel cell module according to a second embodiment of the present invention.

FIG. 7 is a cross sectional view showing main components of a fuel cell module 120 according to a second embodiment of the present invention. The constituent elements of the fuel cell module 120 according to the second embodiment of the present invention that are identical to those of the fuel cell module 12 according to the first embodiment are labeled with the same reference numerals, and descriptions thereof will be omitted. Also in third and other embodiments as described later, the constituent elements that are identical to those of the fuel cell module 12 according to the first embodiment are labeled with the same reference numerals, and descriptions thereof will be omitted.

A baffle member 122 is provided inside the first partition plate 60a, between the exhaust gas combustor 52 and the start-up combustor 54. In the second embodiment, the baffle member 122 is provided adjacent to the first combustion gas holes 62a. The baffle member 122 functions as a combustion gas flow limiting member for limiting the flow of the combustion gas from the exhaust gas combustor 52 to the start-up combustor 54, and limiting the flow of the combustion gas from the start-up combustor 54 to the exhaust gas combustor 52.

The baffle member 122 has a substantially circular disk shape. A flat section 122a is provided on the upper side, and a conical section 122b is provided on the bottom side. The outer circumference of the baffle member 122 is fixed to the inner circumferential surface of the first partition plate 60a at each of substantially the centers of the first combustion gas holes 62a.

In the second embodiment, the combustion gas from the exhaust gas combustor 52 is guided by the flat section 122a of the baffle member 122, and supplied to the first combustion gas holes 62a. The combustion gas from the start-up combustor 54 is guided by the conical section 122b of the baffle member 122, and supplied to the first combustion gas holes 62a. Accordingly, in the second embodiment, the same advantages as in the case of the first embodiment are obtained.

Figure 8:
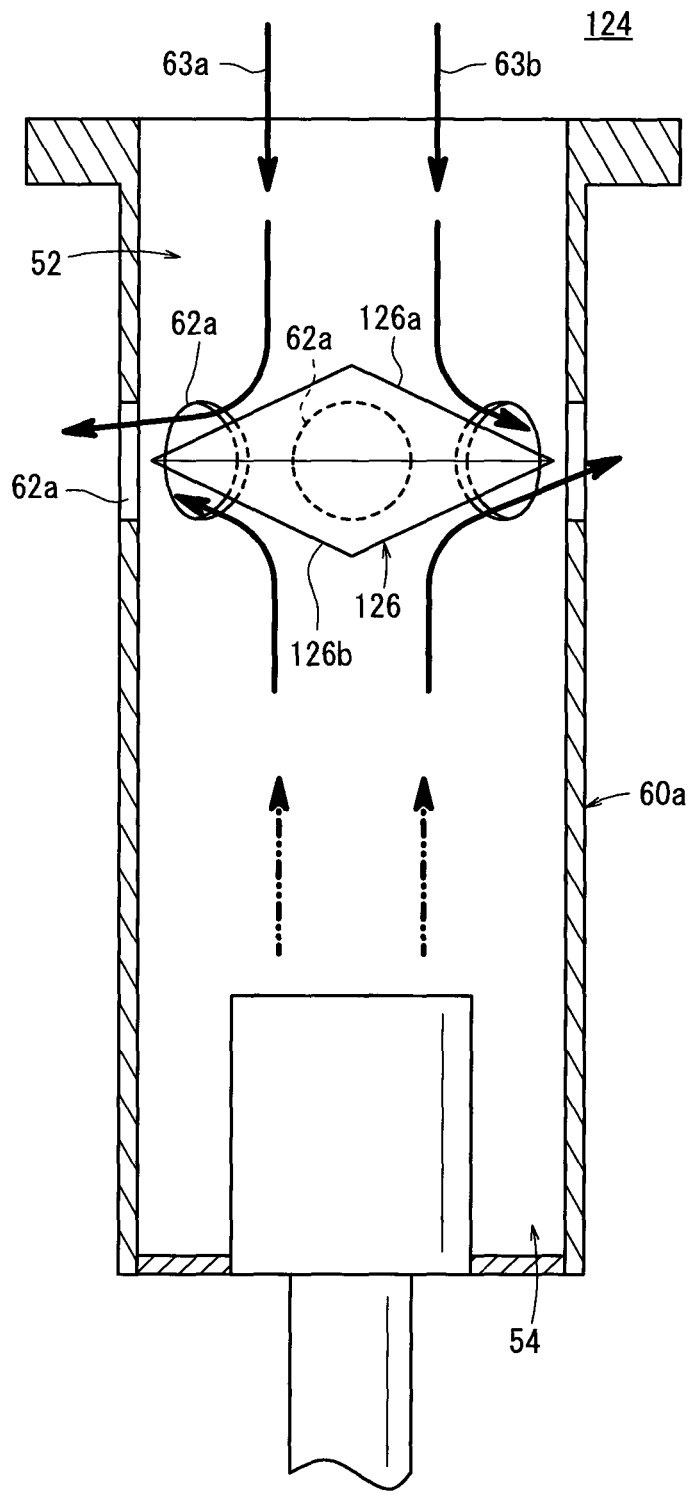
FIG. 8 is a cross sectional view showing main components of a fuel cell module according to a third embodiment of the present invention.

FIG. 8 is a cross sectional view showing main components of a fuel cell module 124 according to a third embodiment of the present invention.

A baffle member 126 is provided inside the first partition plate 60a, between the exhaust gas combustor 52 and the start-up combustor 54. In the third embodiment, the baffle member 126 as a combustion gas flow limiting member is provided adjacent to the first combustion gas holes 62a.

The baffle member 126 has a substantially circular disk shape. A conical section 126a is provided on the upper side, and a conical section 126b is provided on the bottom side. The outer circumference of the baffle member 126 is fixed to the inner circumferential surface of the first partition plate 60a at each of substantially the centers of the first combustion gas holes 62a.

In the third embodiment, the conical section 126a of the baffle member 126 has a function of guiding the combustion gas from the exhaust gas combustor 52, and the conical section 126b of the baffle member 126 has a function of guiding the combustion gas from the start-up combustor 54. Accordingly, in the third embodiment, the same advantages as in the cases of the first and second embodiments are obtained.

Figure 9:
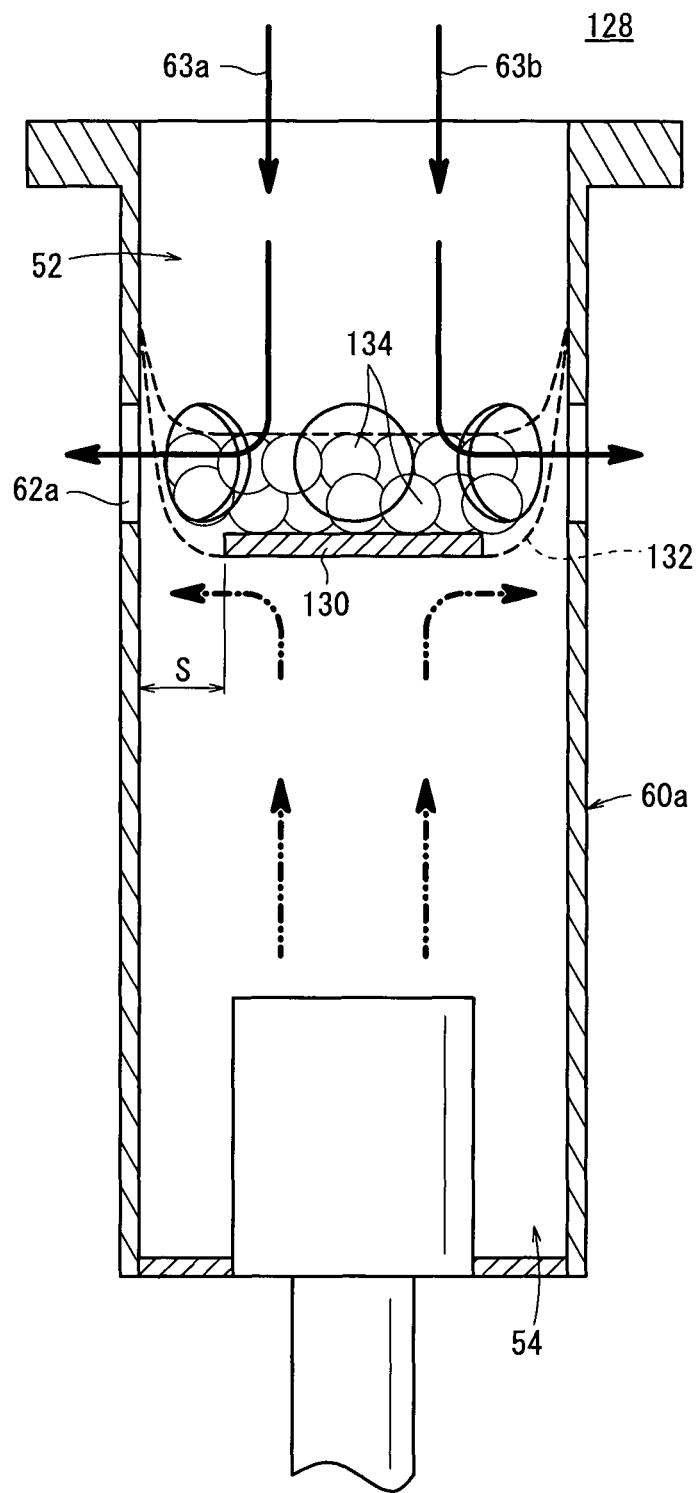
FIG. 9 is a cross sectional view showing main components of a fuel cell module according to a fourth embodiment of the present invention.

FIG. 9 is a cross sectional view showing main components of a fuel cell module 128 according to a fourth embodiment of the present invention.

A baffle plate 130 is provided inside the first partition plate 60a, between the exhaust gas combustor 52 and the start-up combustor 54. In the fourth embodiment, the baffle plate 130 is provided as a combustion gas flow limiting member adjacent to the first combustion gas holes 62a. The baffle plate 130 has a circular disk shape having a diameter which is smaller than the inner diameter of the first partition plate 60a, and the baffle plate 130 is supported by a mesh 132. A gap S is formed between the outer circumference of the baffle plate 130 and the inner circumference of the first partition plate 60a.

The mesh 132 is fixed to the inner circumferential surface of the first partition plate 60a, and the baffle plate 130 is provided below the first combustion gas holes 62a. A plurality of combustion catalyst pieces 134 are placed on the baffle plate 130, within the mesh 132. For example, platinum based combustion catalyst is used for the combustion catalyst pieces 134.

In the fourth embodiment, the space inside the first partition plate 60a is divided by the baffle plate 130, and the combustion catalyst pieces 134 for facilitating combustion of the combustion gas are provided on the baffle plate 130. Therefore, if flame-out occurs in the exhaust gas combustor 52, combustion is facilitated by the combustion catalyst pieces 134, and improvement in the stability of the thermally self-sustaining operation is achieved suitably.

Figure 10:
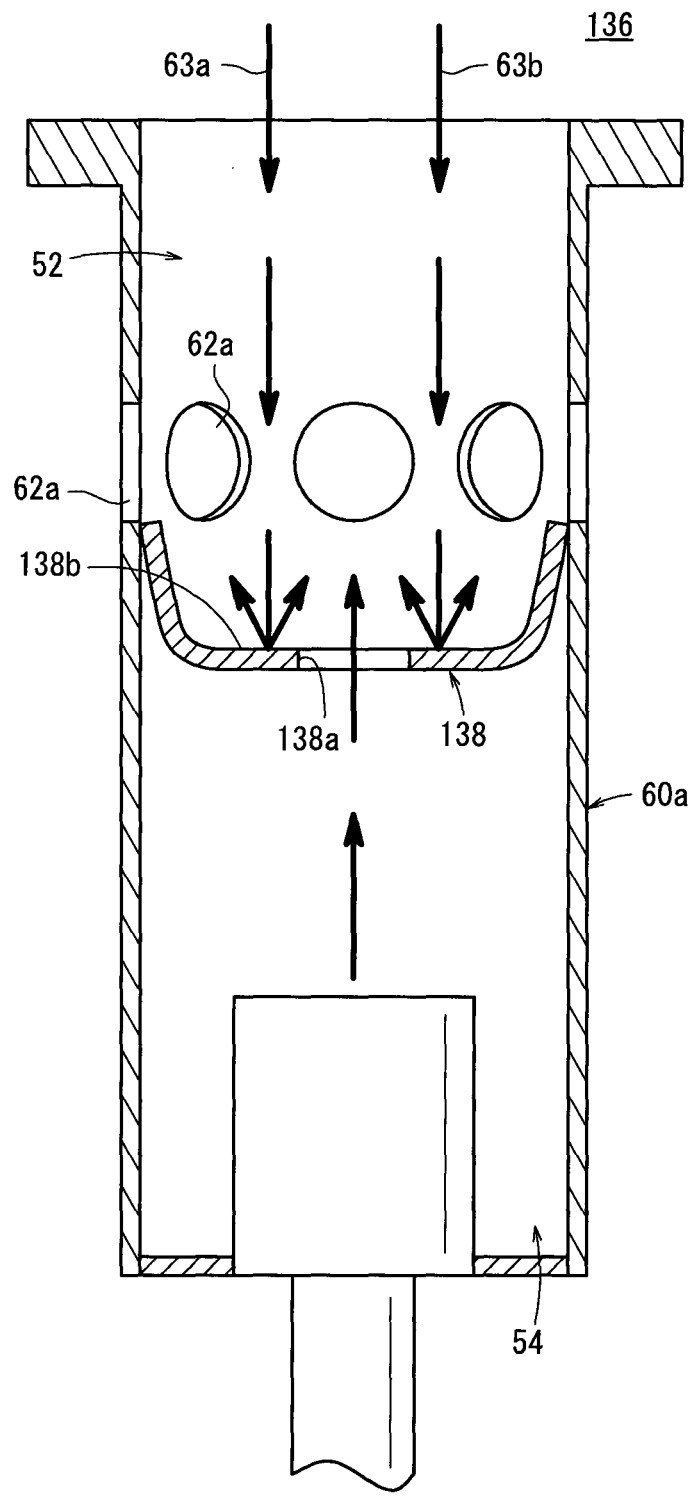
FIG. 10 is a cross sectional view showing main components of a fuel cell module according to a fifth embodiment of the present invention.

FIG. 10 is a cross sectional view showing main components of a fuel cell module 136 according to a fifth embodiment of the present invention.

A baffle member 138 is provided inside the first partition plate 60a, between the exhaust gas combustor 52 and the start-up combustor 54. In the fifth embodiment, the baffle member 138 as a combustion gas flow limiting member is provided below, and adjacent to the first combustion gas holes 62a.

The baffle member 138 has a cup shape (cylindrical shape having a bottom) with an opening at an upper end, formed by curving (or bending) a plate member. A combustion gas flow hole 138a is formed at substantially the center of an inner bottom surface 138b of the baffle member 138 for allowing the combustion gas to flow through the combustion gas flow hole 138a. The outer circumference of the baffle member 138 is fixed to the inner circumferential surface of the first partition plate 60a, adjacent to the lower ends of the first combustion gas holes 62a.

In the fifth embodiment, the combustion gas from the exhaust gas combustor 52 contacts the inner bottom surface 138b of the baffle member 138, and the combustion gas is guided into the first combustion gas holes 62a. The combustion gas from the start-up combustor 54 flows through the combustion gas flow hole 138a of the baffle member 138, and the combustion gas is guided into the first combustion gas holes 62a. Accordingly, the same advantages as in the case of the first to fourth embodiments are obtained.

Figure 11:
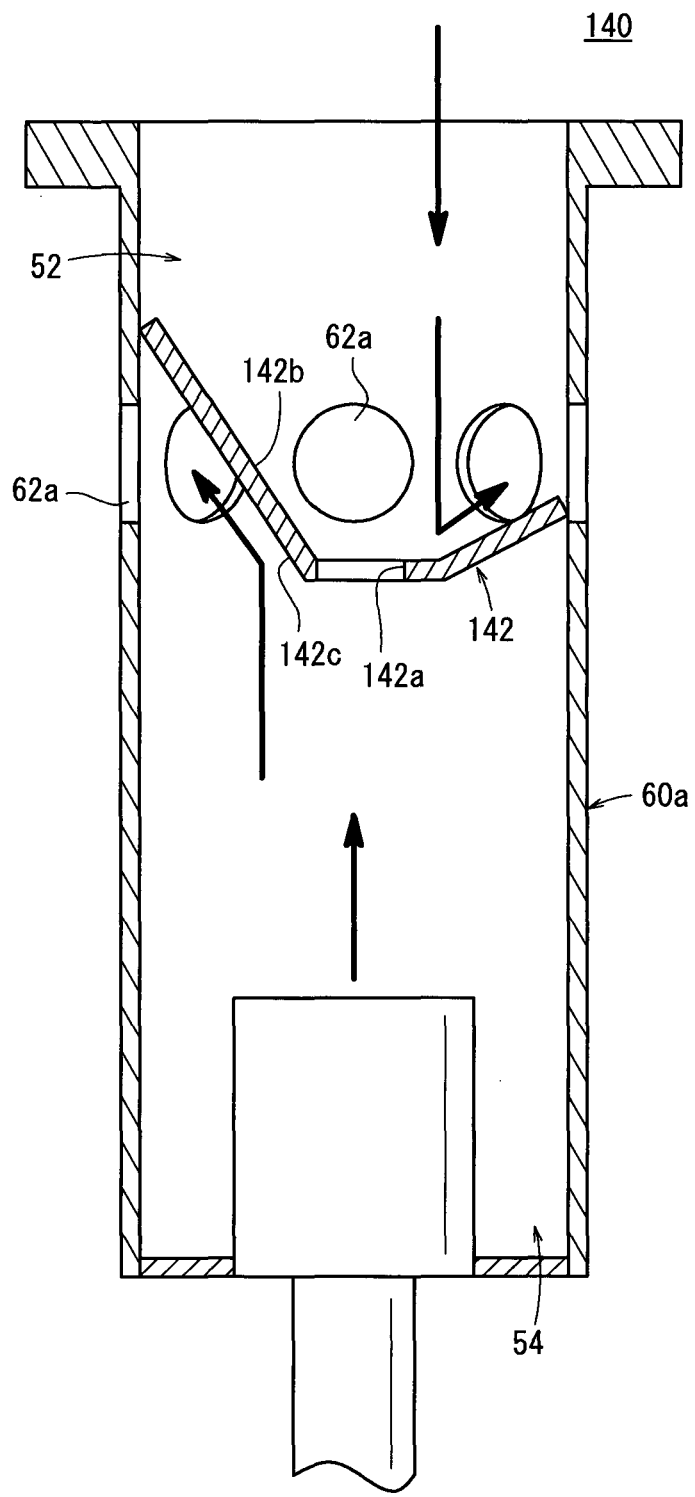
FIG. 11 is a cross sectional view showing main components of a fuel cell module according to a sixth embodiment of the present invention.

FIG. 11 is a cross sectional view showing main components of a fuel cell module 140 according to a sixth embodiment of the present invention.

A baffle member 142 is provided inside the first partition plate 60a, between the exhaust gas combustor 52 and the start-up combustor 54. In the sixth embodiment, the baffle member 142 as a combustion gas flow limiting member is provided adjacent to the first combustion gas holes 62a.

The baffle member 142 is provided by forming a plate member in a substantially conical shape. A fuel gas flow hole 142a is formed at substantially the center of the bottom of the baffle member 142 for allowing the combustion gas to flow through the combustion gas flow hole 142a. The outer circumference of the baffle member 142 is fixed to the inner circumferential surface of the first partition plate 60a, at a position adjacent to the lower end of one of the first combustion gas holes 62a that are opposite to each other radially, and at a position adjacent to the upper end of the other of the first combustion gas holes 62a, i.e., in a slanted orientation.

An inner circumferential surface 142b of the baffle member 142 has a function of guiding the combustion gas from the exhaust gas combustor 52 to the first combustion gas holes 62a, and an outer circumferential surface 142c of the baffle member 142 has a function of guiding the combustion gas from the start-up combustor 54 to the first combustion gas holes 62a.

In the six embodiment, the same advantages as in the cases of first to fifth embodiments are obtained.

Figure 12:
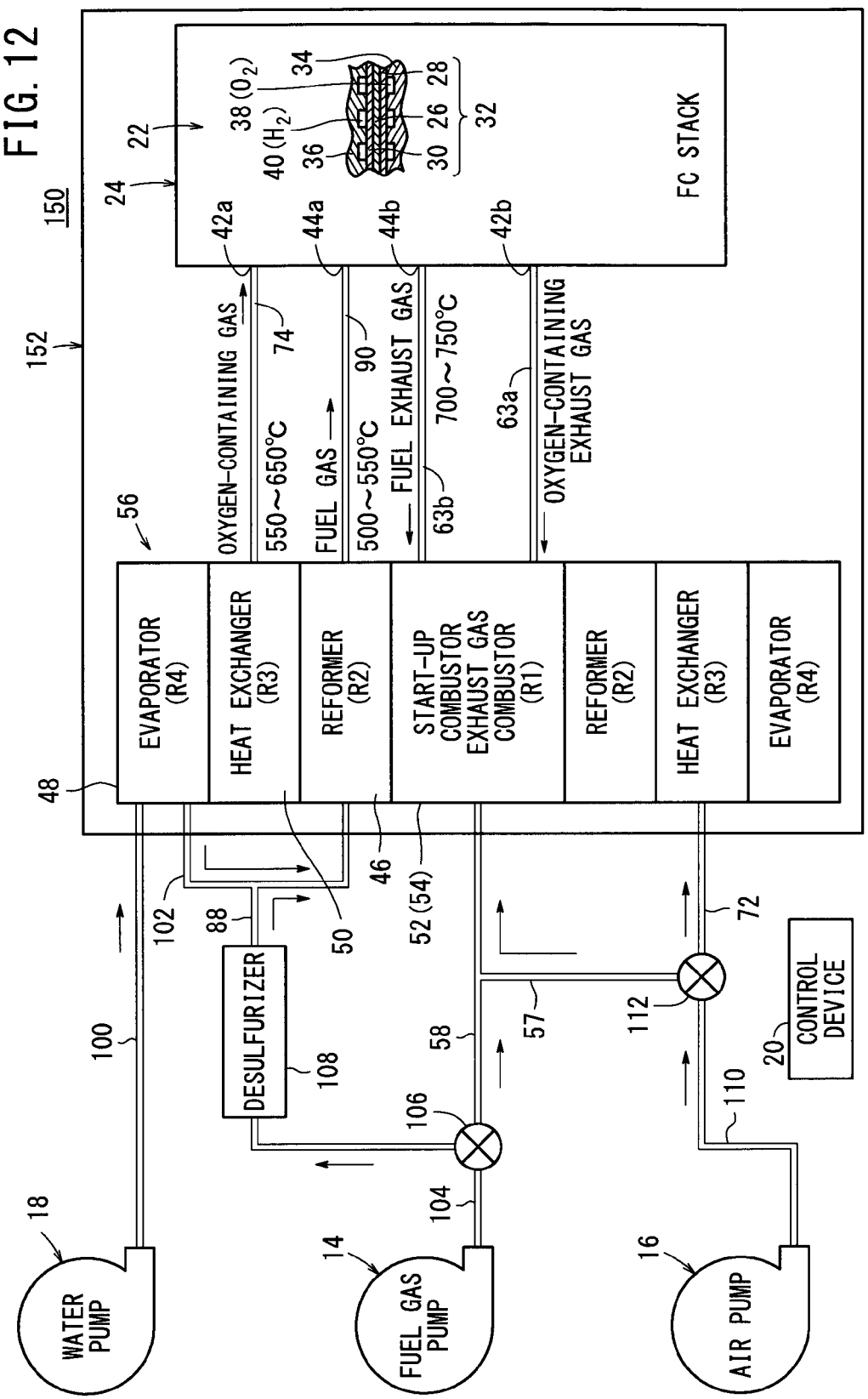
FIG. 12 is a diagram schematically showing structure of a fuel cell system including a fuel cell module according to a seventh embodiment of the present invention.

As shown in FIG. 12, a fuel cell system 150 includes a fuel cell module 152 according to a seventh embodiment of the present invention.

Figure 13:
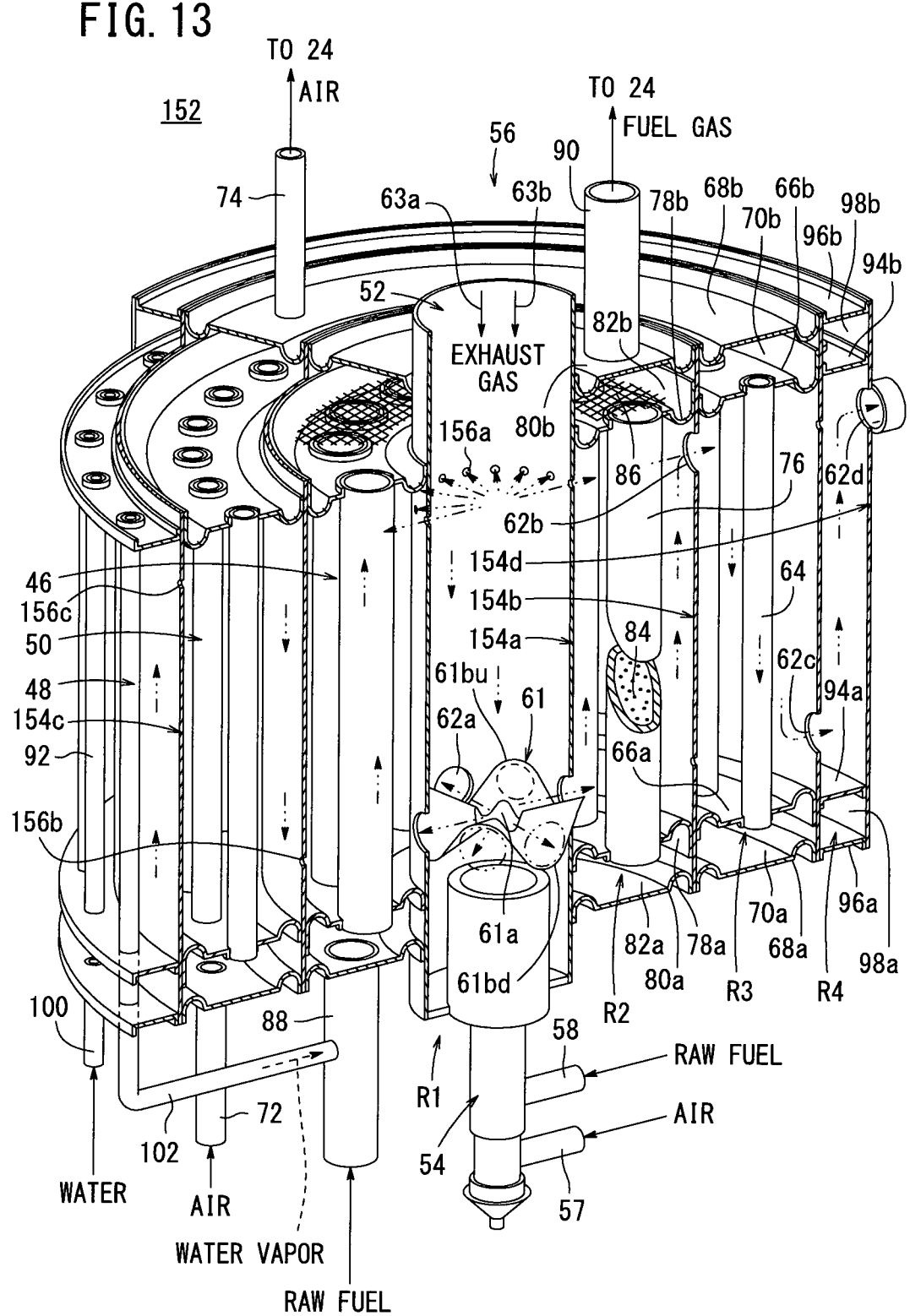
FIG. 13 is a perspective view with partial omission showing FC peripheral equipment of the fuel cell module.

As shown in FIG. 13, the fuel cell module 152 includes a first area R1 comprising, e.g., a circular opening where the exhaust gas combustor 52 and the start-up combustor 54 are provided, an annular second area R2 formed around the first area R1 where the reformer 46 is provided, an annular third area R3 formed around the second area R2 where the heat exchanger 50 is provided, and an annular fourth area R4 formed around the third area R3 where the evaporator 48 is provided.

The FC peripheral equipment 56 includes a first partition plate (partition member) 154a provided between the first area R1 and the second area R2, a second partition plate 154b provided between the second area R2 and the third area R3, a third partition plate 154c provided between the third area R3 and the fourth area R4, and a fourth partition plate 154d around the fourth area R4.

Figure 14:
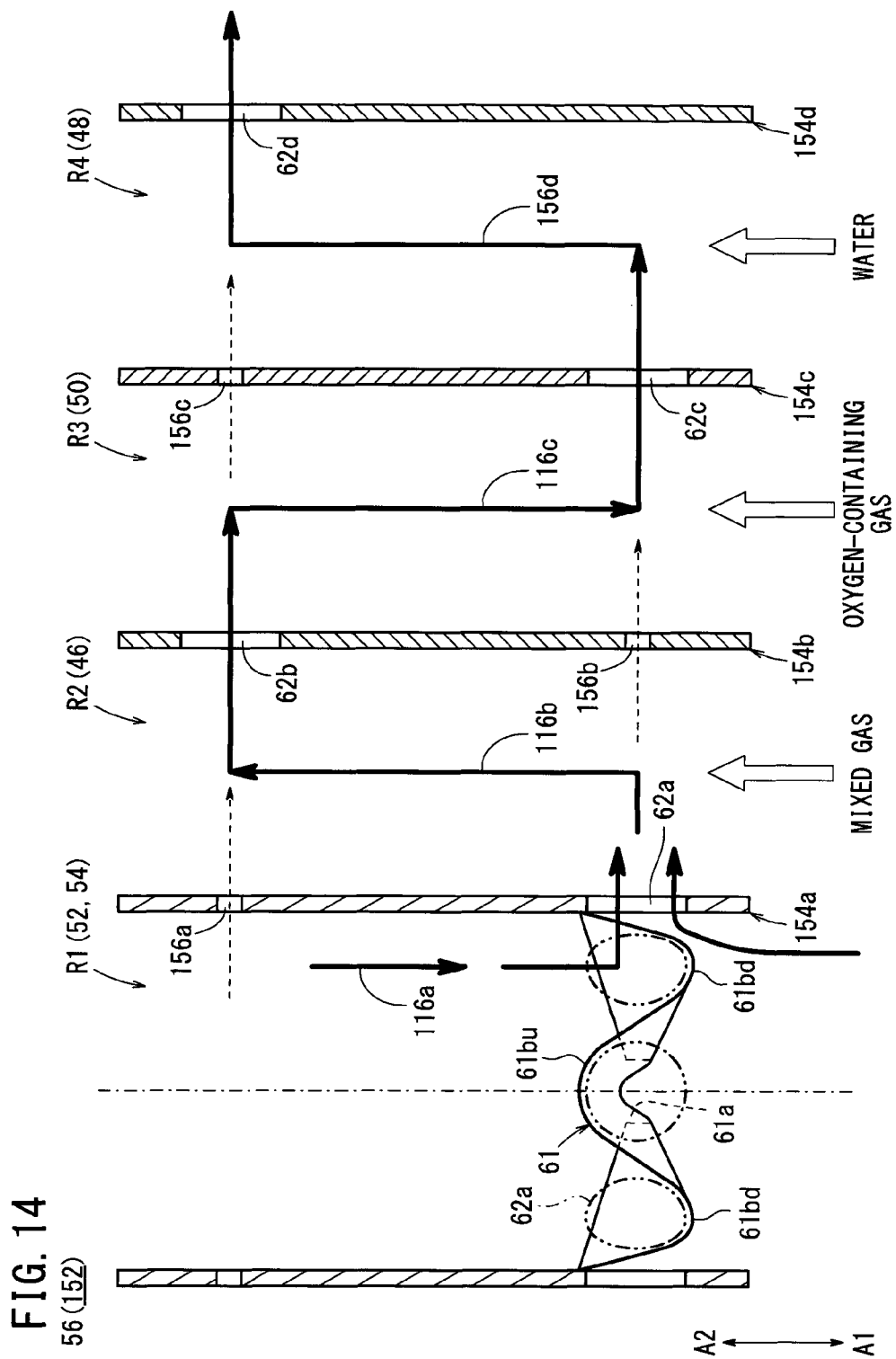
FIG. 14 is a view showing gas flows of a combustion gas in the FC peripheral equipment.
Figure 15:
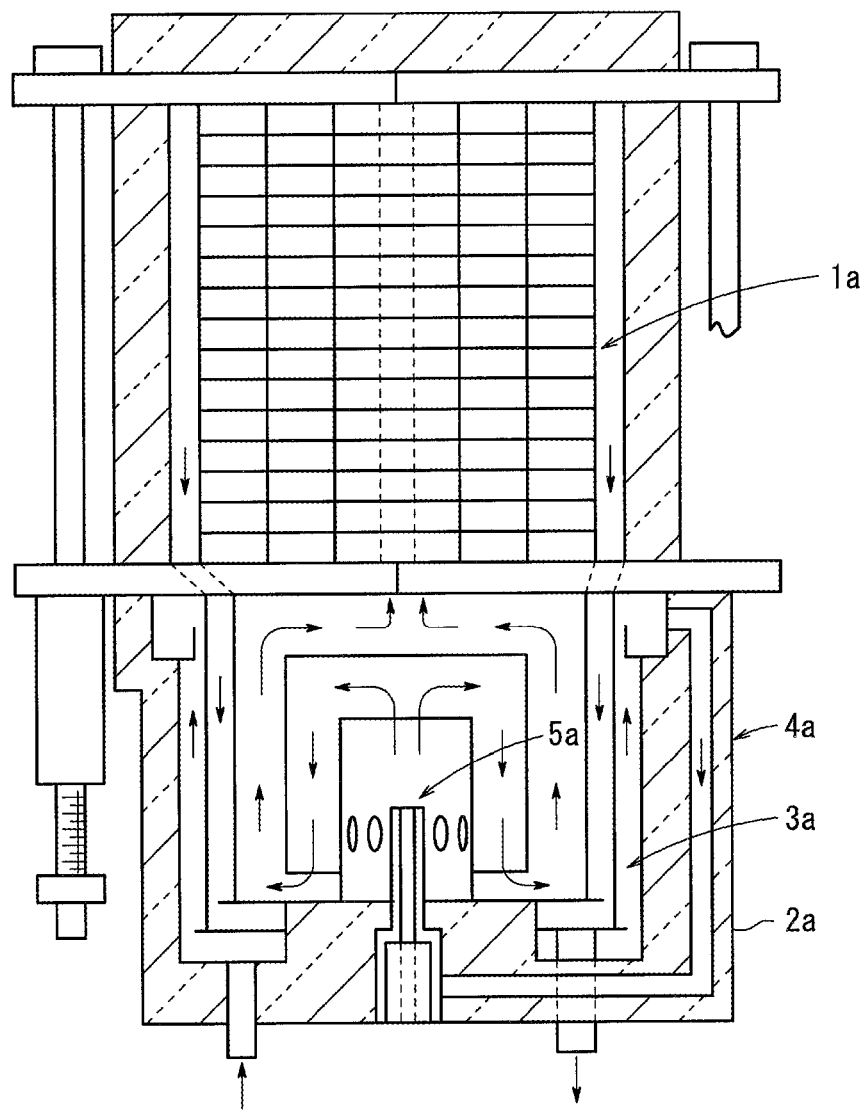
FIG. 15 is a view schematically showing a fuel cell battery disclosed in the conventional technique 1.
Figure 16:
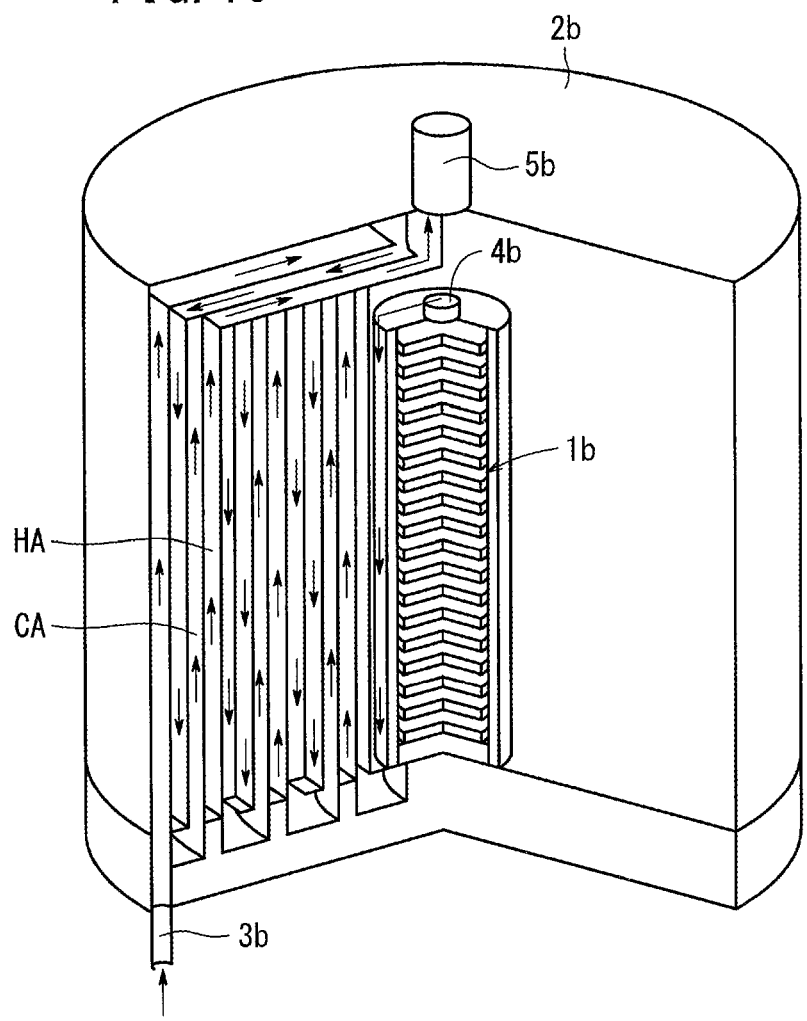
FIG. 16 is a perspective view with partial cutout showing a solid oxide fuel cell disclosed in the conventional technique 2.
Figure 17:
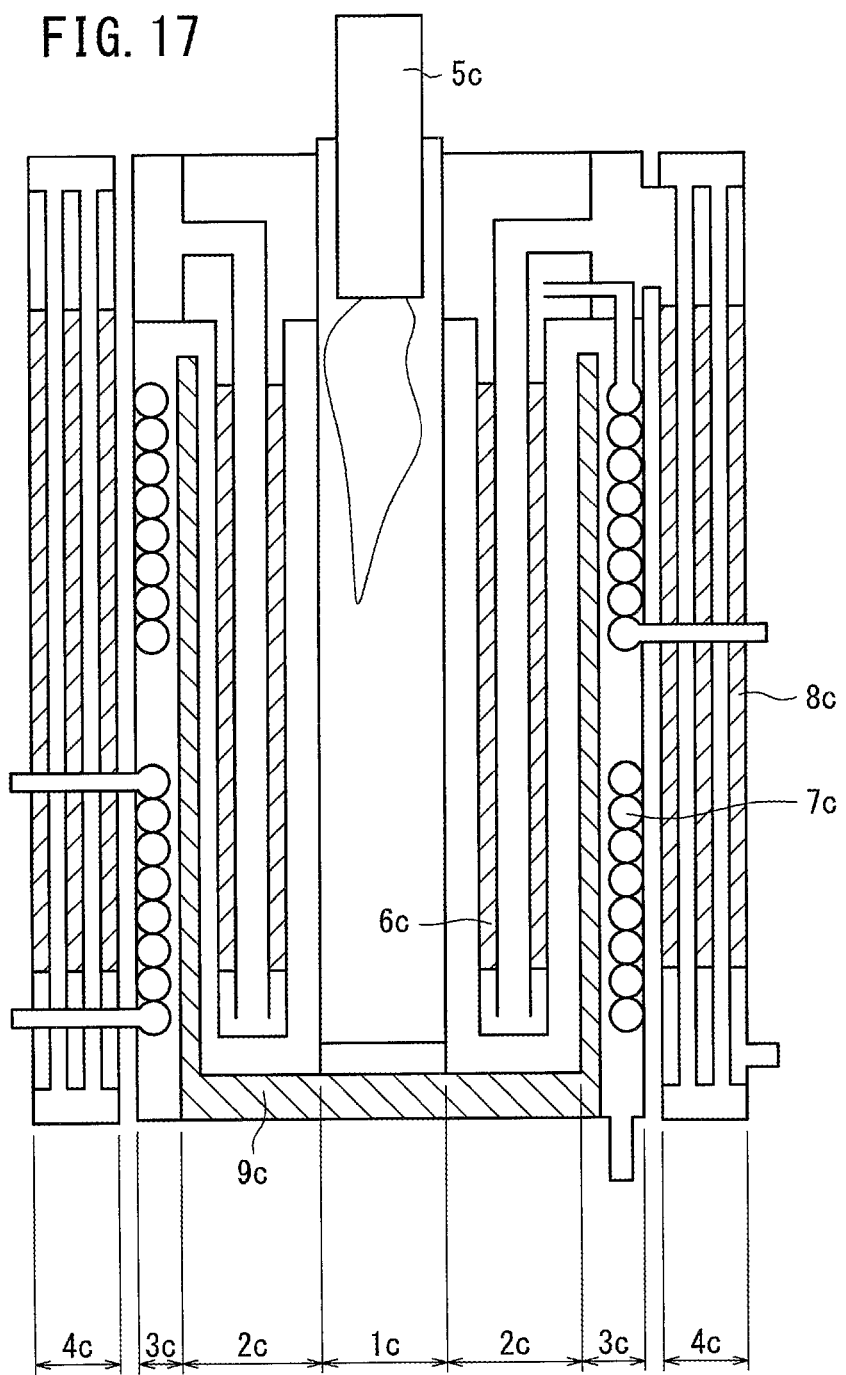
FIG. 17 is a view schematically showing a fuel cell system disclosed in the conventional technique 3.

As shown in FIGS. 13 and 14, first combustion gas holes 62a are provided adjacent to the end of the first partition plate 154a opposite to the fuel cell stack 24, second combustion gas holes 62b are provided adjacent to the end of the second partition plate 154b closer to the fuel cell stack 24, third combustion gas holes 62c are provided adjacent to the end of the third partition plate 154c opposite to the fuel cell stack 24, and fourth combustion gas holes 62d are provided adjacent to the end of the fourth partition plate 154d closer to the fuel cell stack 24.

A plurality of steam extraction holes 156a are formed in the first partition plate 154a opposite to the first combustion gas holes 62a. Each of the steam extraction holes 156a has an opening which is smaller than that of the first combustion gas holes 62a. As shown in FIG. 14, the steam extraction holes 156a are formed at positions facing the second combustion gas holes 62b formed in the second partition plate 154b. A plurality of steam extraction holes 156b are formed in the second partition plate 154b at positions facing the third combustion gas holes 62c formed in the third partition plate 154c. A plurality of steam extraction holes 156c are formed in the third partition plate 154c at positions facing the fourth combustion gas holes 62d formed in the fourth partition plate 154d. The steam extraction holes 156b, 156c are not essential, and should be provided as necessary.

As shown in FIG. 13, a baffle circular member 61 is provided as a combustion gas flow limit member in the first partition plate 154a, adjacent to a plurality of combustion gas holes 62a. As the combustion gas flow limit member, instead of the baffle circular member 61, any of the baffle member 122, the baffle plate 130 (including the mesh 132 and the combustion catalyst pieces 134), the baffle member 138, and the baffle member 142 used in the second to sixth embodiments may be used.

In the seventh embodiment, the fuel cell module 152 includes the first area R1 where the exhaust gas combustor 52 and the start-up combustor 54 are provided, the annular second area R2 formed around the first area R1 where the reformer 46 is provided, the annular third area R3 formed around the second area R2 where the heat exchanger 50 is provided, and the annular fourth area R4 formed around the third area R3 where the evaporator 48 is provided.

In the structure, high temperature equipment with a large heat demand such as the reformer 46 (and the heat exchanger 50) can be provided inside, and low temperature equipment with a small heat demand such as the evaporator 48 can be provided outside. Thus, improvement in the heat efficiency is achieved, and thermally self-sustaining operation is facilitated. Further, simple and compact structure is achieved.

Further, as shown in FIG. 14, in the second area R2, the flow direction of the mixed gas flowing through the reformer 46 in the direction indicated by the arrow A2 and the flow direction of the combustion gas indicated by the arrow A2 are the same, i.e., the mixed gas and the combustion gas flow in a parallel manner. In the third area R3, the flow direction of the oxygen-containing gas flowing through the heat exchanger 50 in the direction indicated by the arrow A2 is opposite to the flow direction of the combustion gas indicated by the arrow A1, i.e., the oxygen-containing gas and the combustion gas flow in a counterflow manner.

Further, the extraction holes 156a are formed in the first partition plate 154a opposite to the first combustion gas holes 62a. Each of the steam extraction holes 156a has an opening which is smaller than that of the first combustion gas holes 62a. In the presence of the steam extraction holes 156a, some of the combustion gas flows from the first area R1 through the second area R2 into the third area R3. Thus, the heat quantity required in the heat exchanger 50 in the third area R3 can be supplemented, and it becomes possible to maintain the thermally self-sustaining operation.

Further, the combustion gas flow limiting member (e.g., the baffle circular member 61) is provided inside the first partition plate 154a. In the structure, the same advantages as in the cases of the first to sixth embodiments are obtained. For example, the exhaust gas combustor 52 and the start-up combustor 54 are not exposed to the combustion gas unnecessarily, and improvement in the durability is achieved easily.

While the invention has been particularly shown and described with reference to preferred embodiments, it will be understood that variations and modifications can be effected thereto by those skilled in the art without departing from the scope of the invention as defined by the appended claims.

The invention claimed is:

1. A fuel cell module, comprising:
   a fuel cell stack formed by stacking a plurality of fuel cells for generating electricity by electrochemical reactions of a fuel gas and an oxygen-containing gas;
   a reformer for reforming a mixed gas of water vapor and a raw fuel chiefly containing hydrocarbon to produce the fuel gas supplied to the fuel cell stack;
   an evaporator for evaporating water, and supplying the water vapor to the reformer;
   a heat exchanger for raising a temperature of the oxygen-containing gas by heat exchange with a combustion gas, and supplying the oxygen-containing gas to the fuel cell stack;
   an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas; and
   a start-up combustor for combusting the raw fuel and the oxygen-containing gas to produce the combustion gas,
   wherein the fuel cell module includes:
   a first area where the exhaust gas combustor and the start-up combustor are provided;
   an annular second area around the first area where one of the reformer and the heat exchanger is provided;
   an annular third area around the second area where another of the reformer and the heat exchanger is provided;
   an annular fourth area around the third area where the evaporator is provided; and
   a partition member provided between the first area and the second area, the partition member having a combustion gas hole for allowing the combustion gas to flow from the first area to the second area,
   and wherein the exhaust gas combustor and the start-up combustor are provided coaxially inside the partition member, and a combustion gas flow limiting member is provided between the exhaust gas combustor and the start-up combustor for limiting flow of the combustion gas from the exhaust gas combustor to the start-up combustor or flow of the combustion gas from the start-up combustor to the exhaust gas combustor.

2. The fuel cell module according to claim 1, wherein the exhaust gas combustor is provided adjacent to one end of the partition member closer to the fuel cell stack; and
   the start-up combustor is provided adjacent to another end of the partition member opposite to the fuel cell stack.

3. The fuel cell module according to claim 1, wherein the combustion gas flow limiting member is provided at the partition member, adjacent to the combustion gas hole.

4. The fuel cell member according to claim 1, wherein a combustion gas flow hole is formed in the combustion gas flow limiting member for allowing the combustion gas to flow through the combustion gas flow hole.

5. The fuel cell module according to claim 1, wherein combustion catalyst for facilitating combustion of the combustion gas is provided at the combustion gas flow limiting member.

6. The fuel cell module according to claim 1, wherein the fuel cell module is a solid oxide fuel cell module.

* * * * *